(12) United States Patent
Werner et al.

(10) Patent No.: US 8,534,450 B2
(45) Date of Patent: Sep. 17, 2013

(54) METHOD AND DEVICE FOR FORMATION OF GROUPS OF ARTICLES TO BE PACKAGED AND A PROFILED THRUST BAR TO USE FOR THIS PURPOSE

(75) Inventors: Juergen Werner, Bruckmuehl (DE);
Herbert Spindler, Riedering (DE);
Peter Koch, Seeon/Chiemgau (DE);
Florian Kaestner, Rosenheim (DE);
Volker Drahuniak, Raubling (DE)

(73) Assignee: Krones AG, Neutraubling (DE)

( * ) Notice: Subject to any disclaimer, the term of this patent is extended or adjusted under 35 U.S.C. 154(b) by 461 days.

(21) Appl. No.: 12/807,122

(22) Filed: Aug. 27, 2010

(65) Prior Publication Data
US 2012/0031050 A1 Feb. 9, 2012

(30) Foreign Application Priority Data
Aug. 5, 2010 (DE) .......................... 10 2010 033 549

(51) Int. Cl.
*B65G 57/22* (2006.01)
(52) U.S. Cl.
USPC .......................................................... 198/429
(58) Field of Classification Search
USPC ................ 198/418.7, 439.3, 429; 414/791.6, 414/791.7, 794.7
See application file for complete search history.

(56) References Cited

U.S. PATENT DOCUMENTS

| | | | |
|---|---|---|---|
| 2,535,880 A | 12/1950 | Tomkins | |
| 3,612,299 A * | 10/1971 | Shaw et al. | 414/791.7 |
| 3,724,639 A | 4/1973 | Hara | 198/31 R |
| 3,778,959 A * | 12/1973 | Langen et al. | 53/543 |
| 3,934,713 A | 1/1976 | Van der Meer et al. | |
| 4,132,305 A * | 1/1979 | Mastak | 198/432 |
| 5,074,744 A * | 12/1991 | Mastak | 414/791.7 |
| 5,238,101 A * | 8/1993 | Ota et al. | 198/626.5 |
| 5,271,709 A | 12/1993 | VanderMeer et al. | |
| 5,667,055 A * | 9/1997 | Gambetti | 198/419.3 |
| 6,490,845 B1 | 12/2002 | Tyreman | 53/448 |
| 6,688,839 B1 * | 2/2004 | Hirschek et al. | 414/799 |
| 6,837,360 B2 * | 1/2005 | Schoeneck | 198/426 |
| 7,128,217 B2 * | 10/2006 | Henry | 209/643 |
| 7,726,464 B2 * | 6/2010 | Cerf | 198/419.3 |
| 7,815,034 B2 | 10/2010 | Fleck et al. | |
| 8,235,201 B2 * | 8/2012 | Miller et al. | 198/419.3 |
| 2010/0012462 A1 | 1/2010 | Cerf et al. | |

FOREIGN PATENT DOCUMENTS

| | | |
|---|---|---|
| CN | 1810580 | 8/2006 |
| DE | 19 56 474 | 5/1971 |
| DE | 93 10 937 | 1/1994 |
| DE | 20 2008 011454 | 10/2008 |
| NL | 7 400 367 | 7/1974 |
| WO | WO 2006/024460 | 3/2006 |
| WO | WO 2010/096111 | 8/2010 |

* cited by examiner

*Primary Examiner* — Douglas Hess
(74) *Attorney, Agent, or Firm* — Davidson, Davidson & Kappel, LLC

(57) ABSTRACT

A method for formation of a compacted arrangement of articles to be packaged within a packaging machine, whereby the group of articles come into contact with and is guided through the packaging machine via at least one profiled bar, at least in a partial section of its transport route, which comes into contact with an end face of the group of articles and in doing so at least some of the articles of the group are pushed together in the compacted arrangement. A device for implementation of the method for formation of a compacted group of a plurality of the same type of articles to be packaged. A symmetrically or asymmetrically profiled thrust bar for transforming a group of articles being conveyed in a horizontal direction into a compacted arrangement.

20 Claims, 38 Drawing Sheets

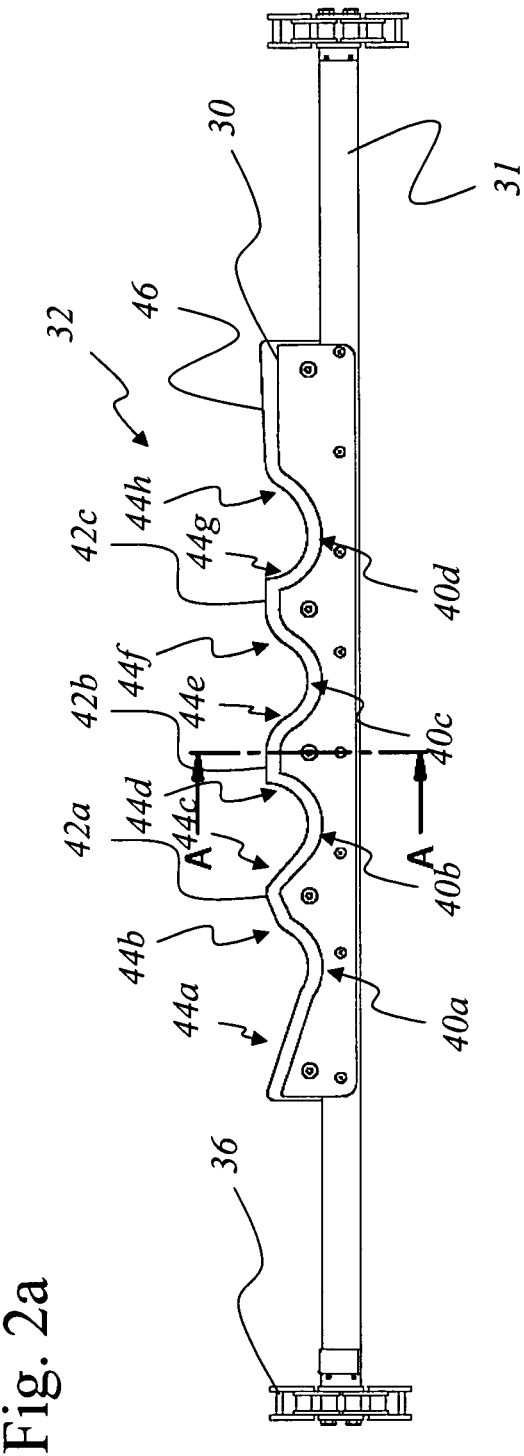
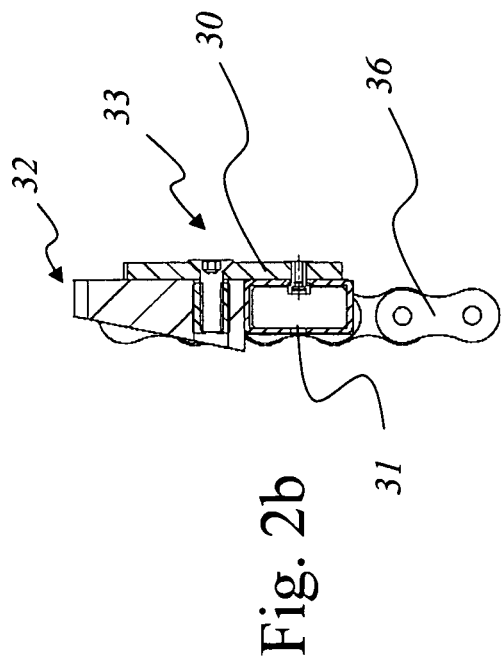
Fig. 2a
Fig. 2b

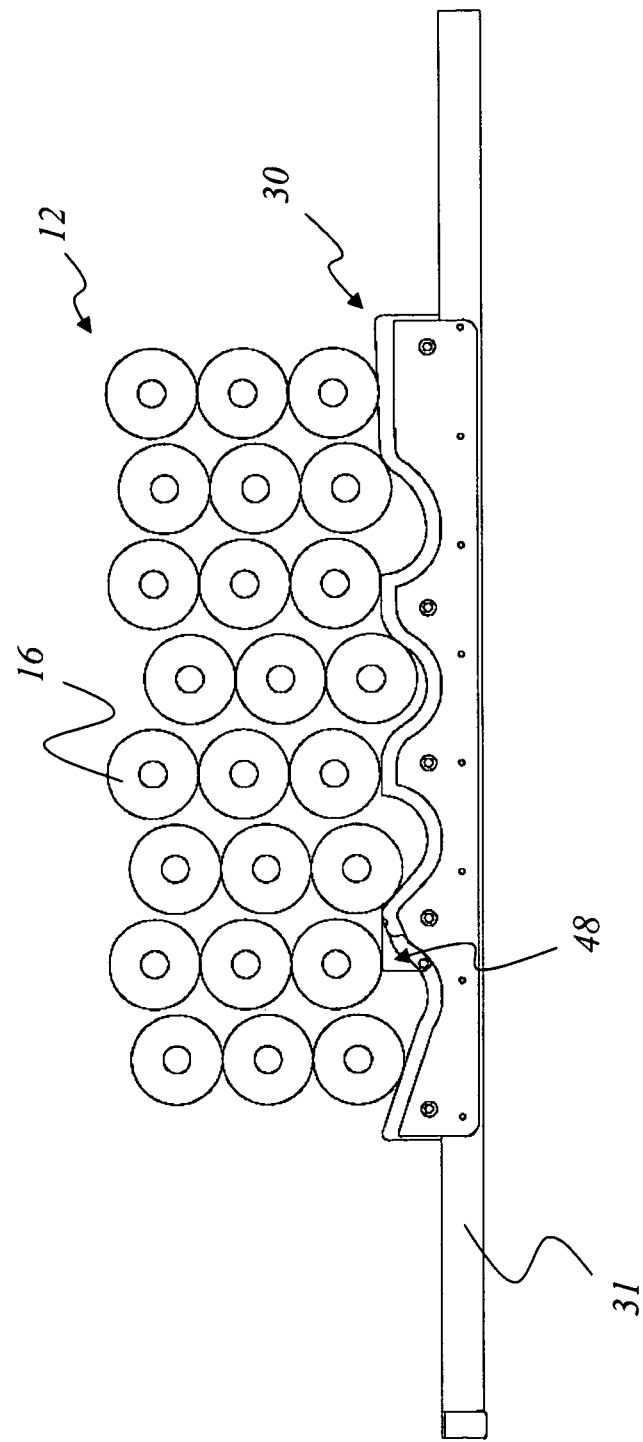

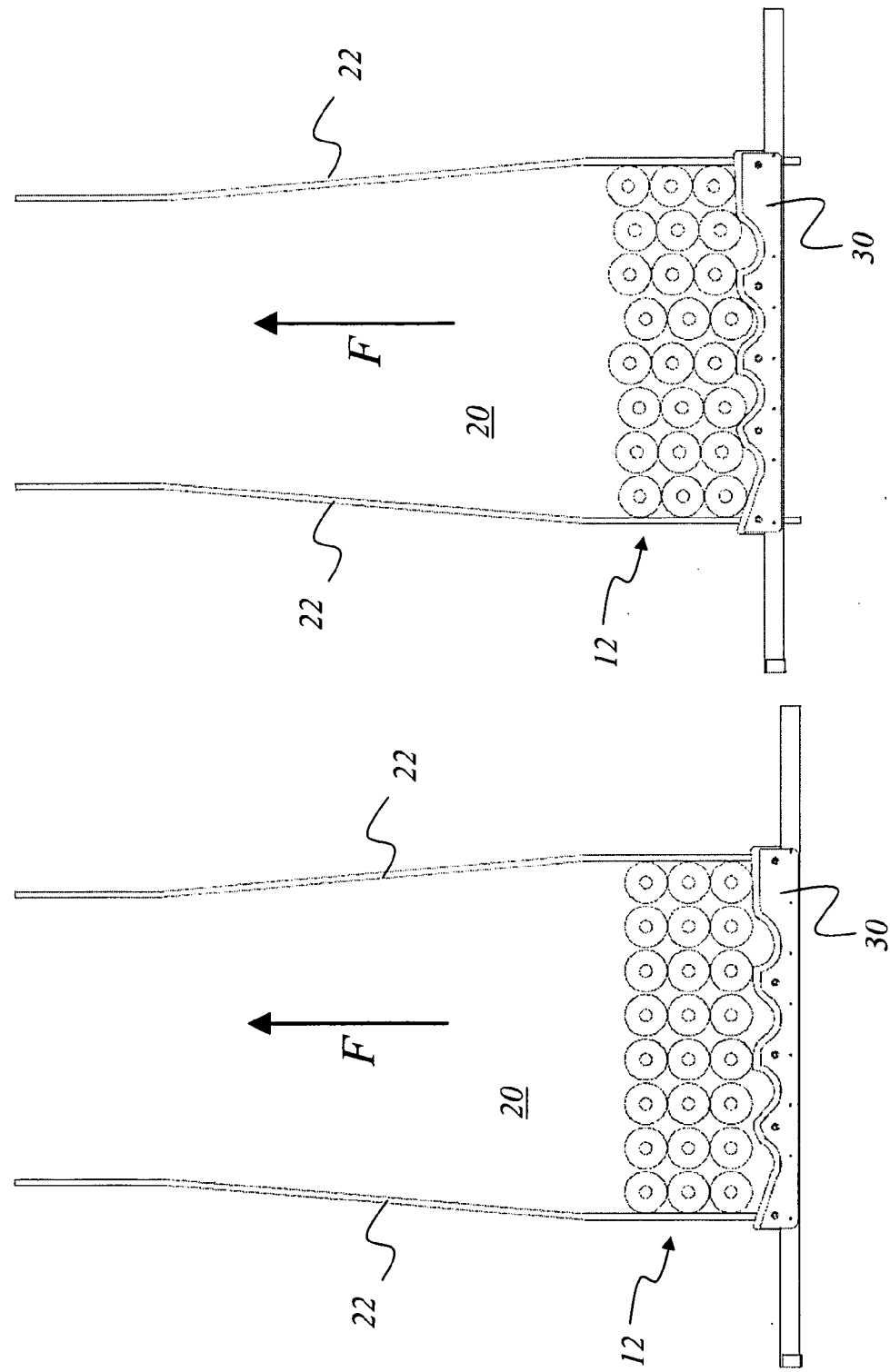

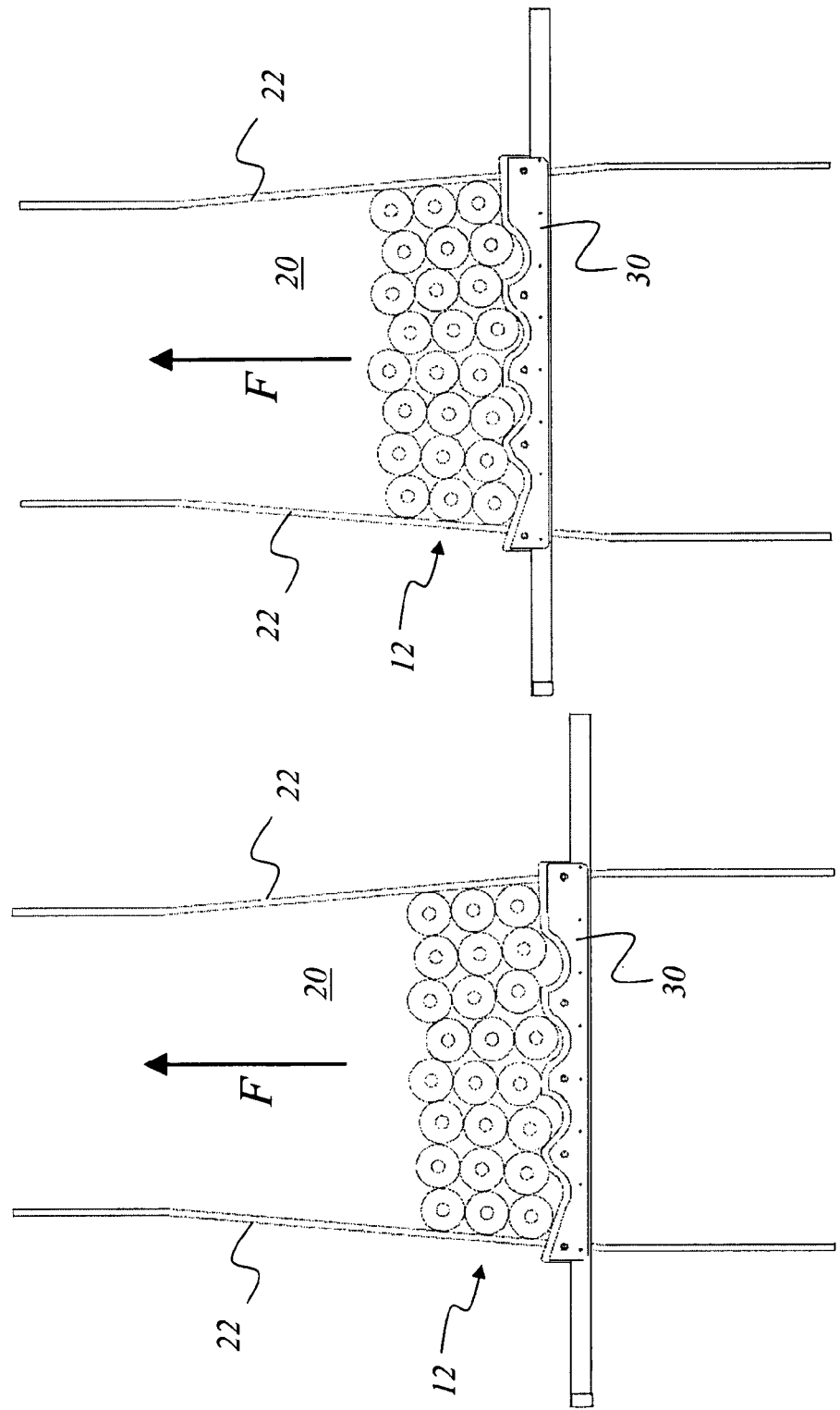

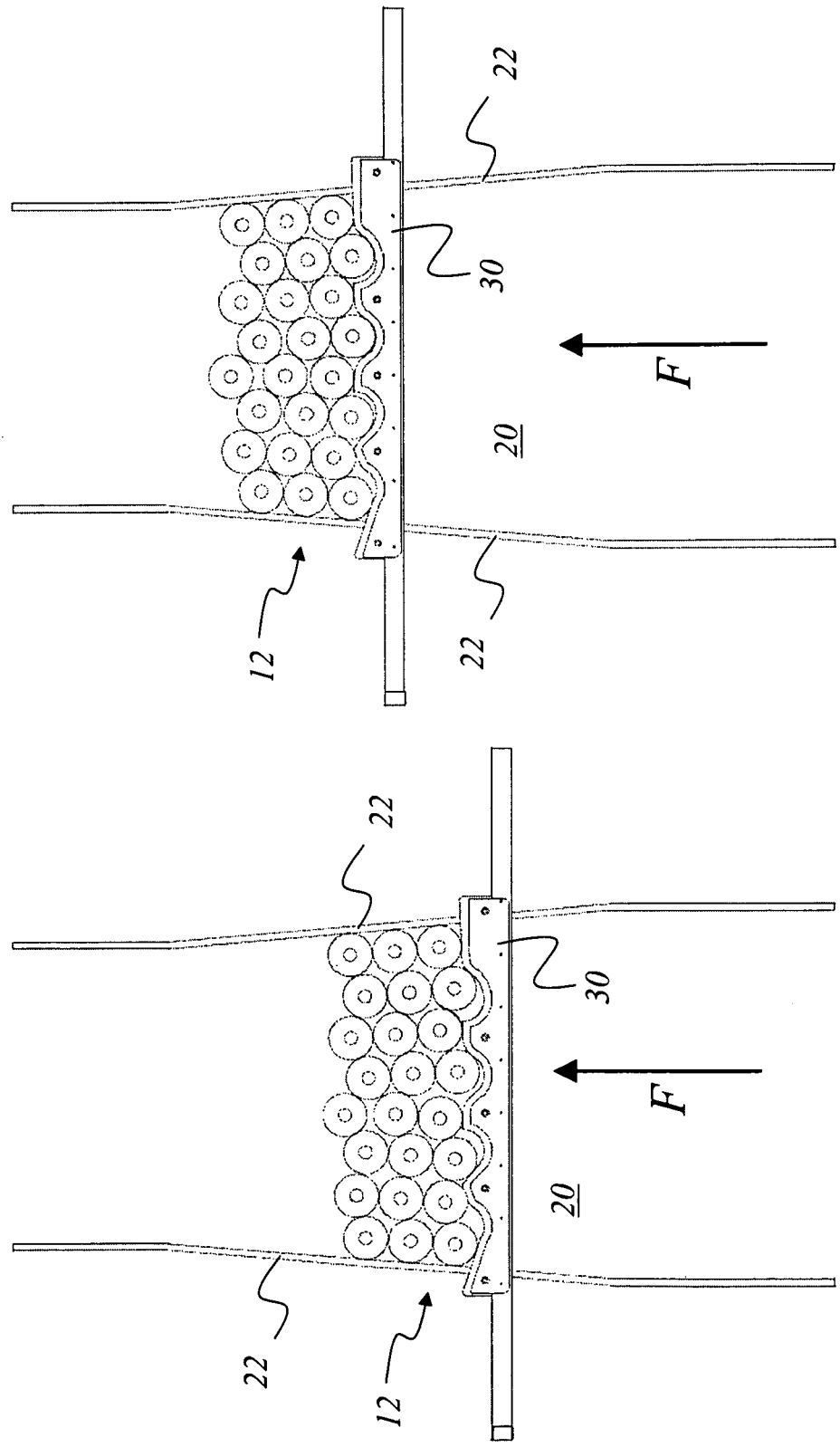

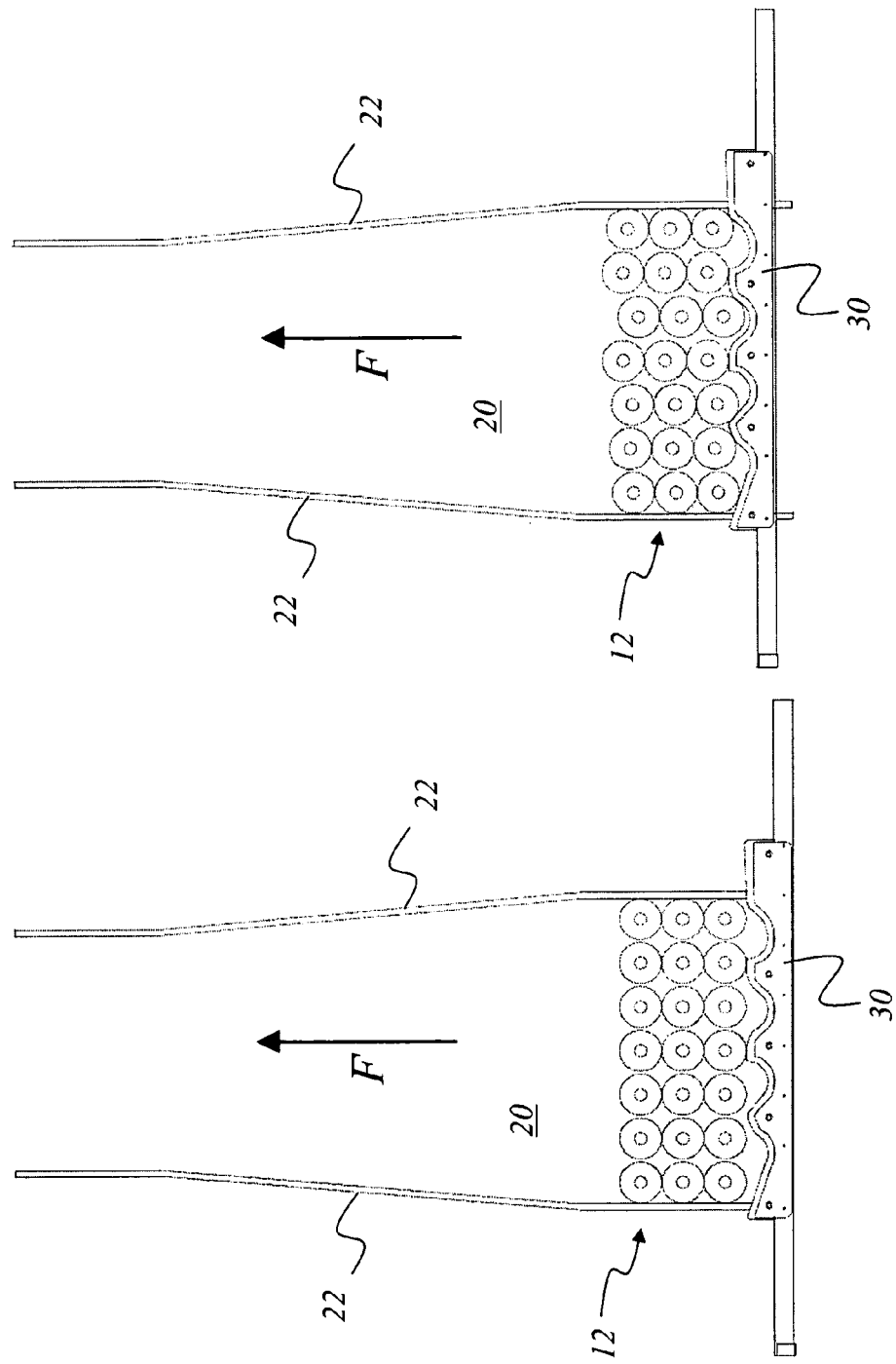

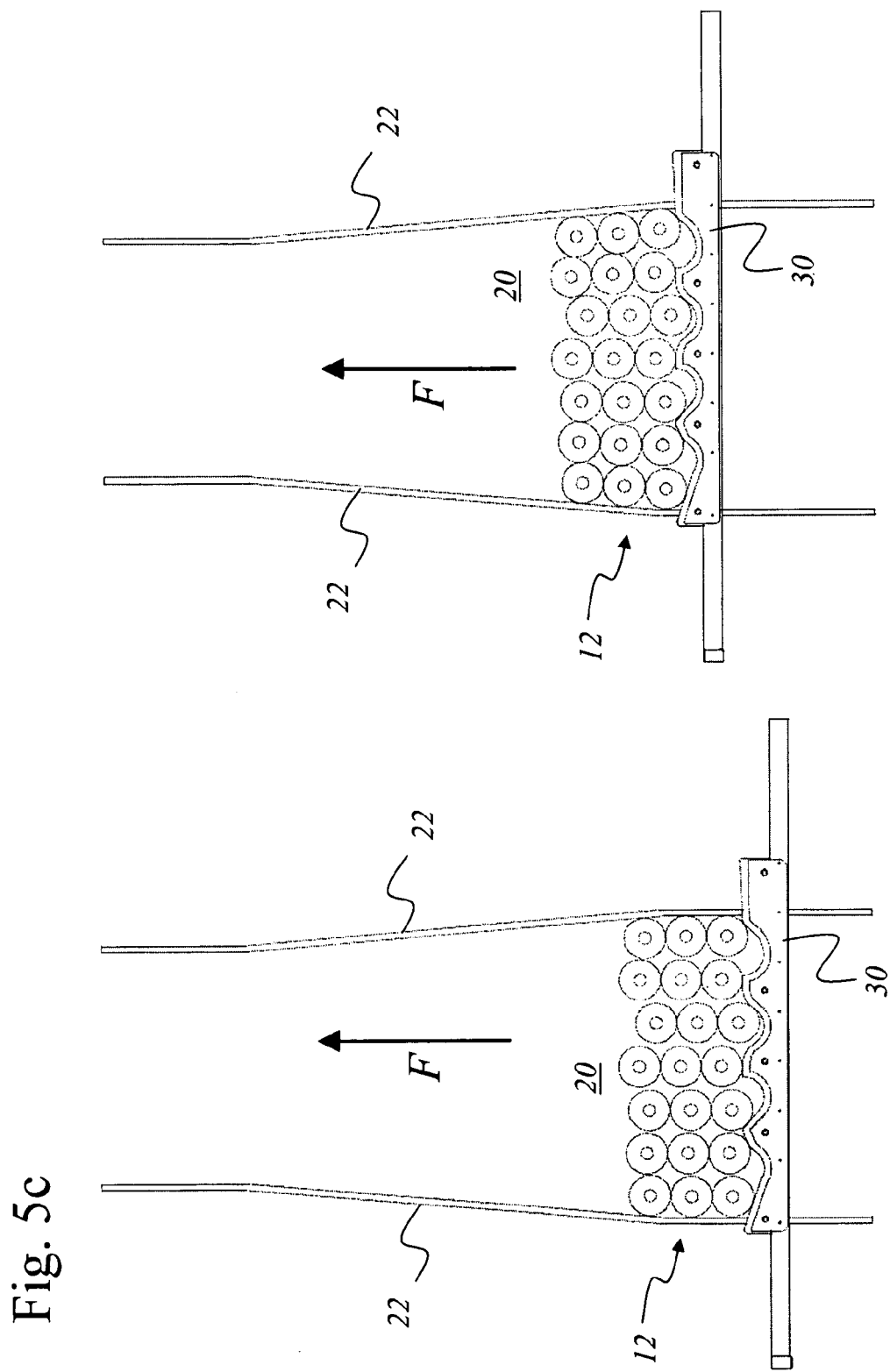

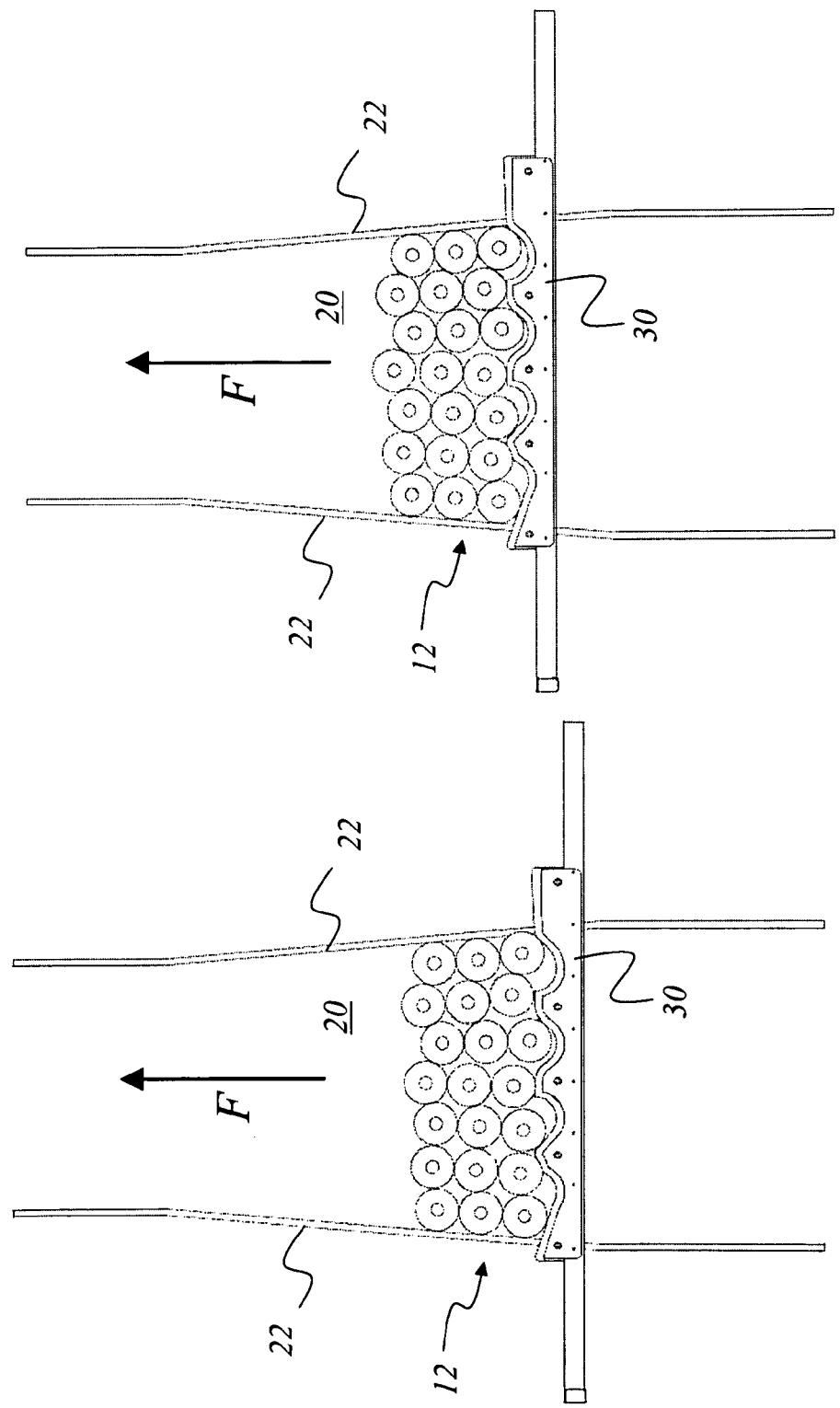

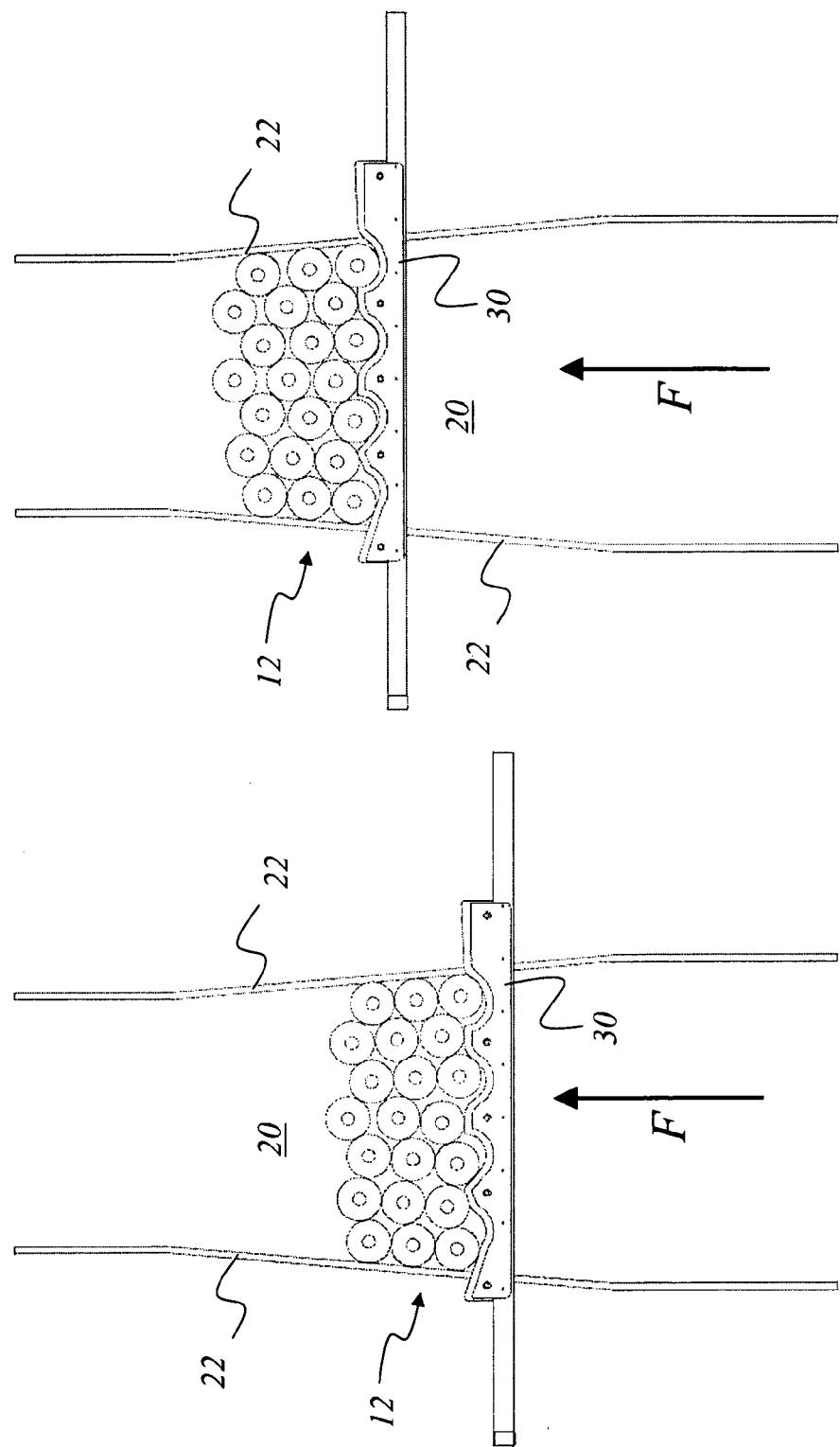

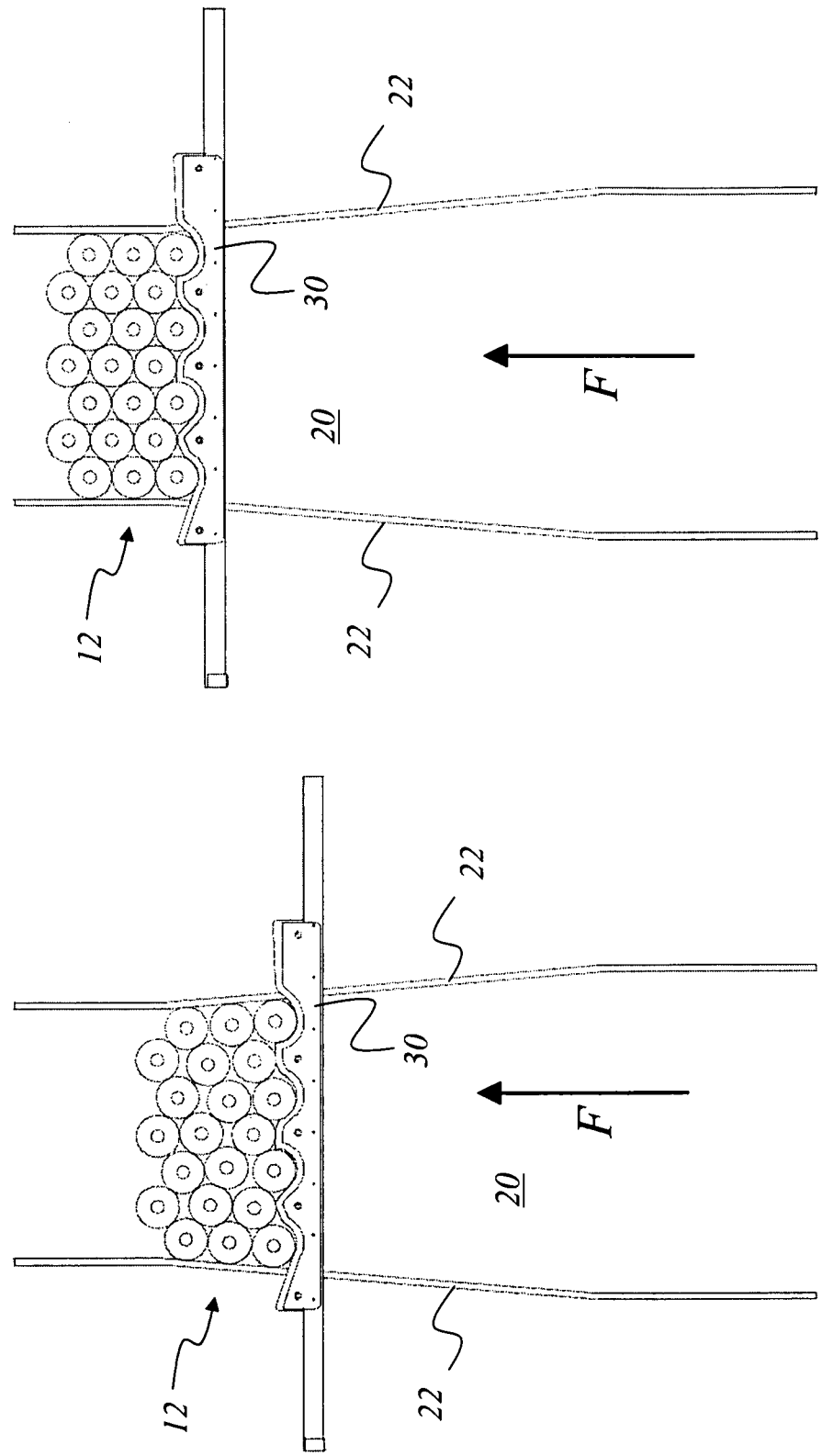

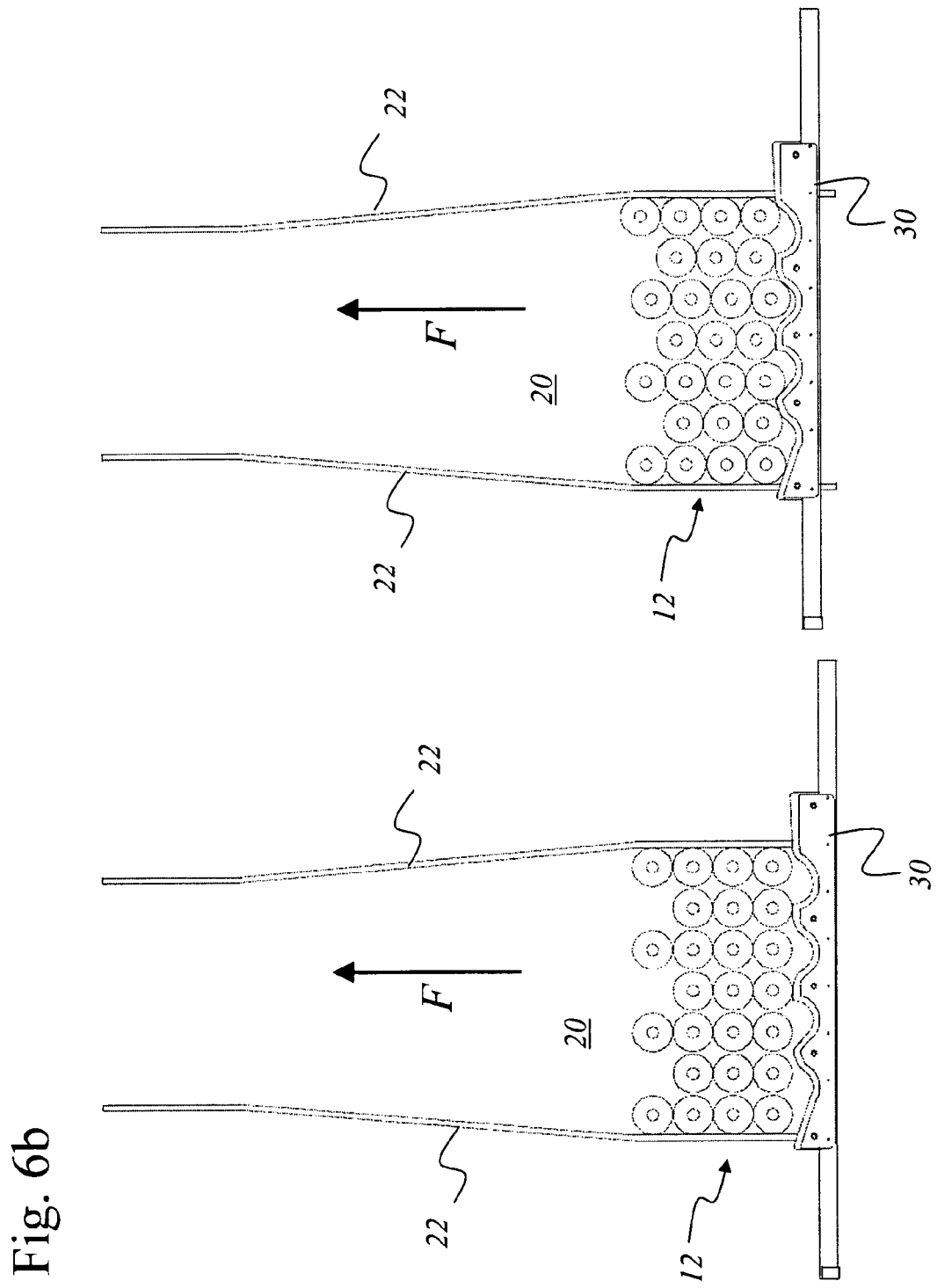

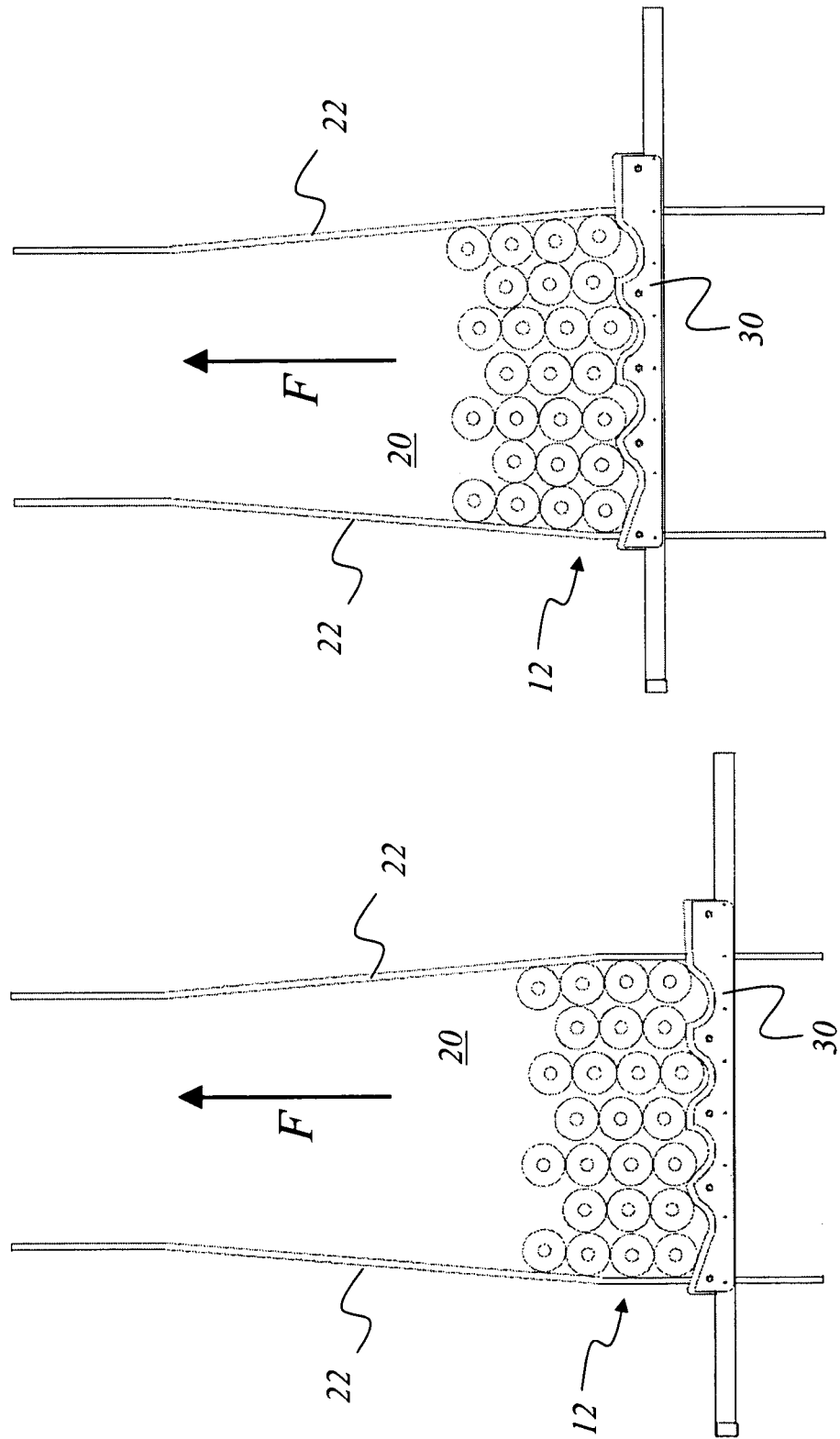

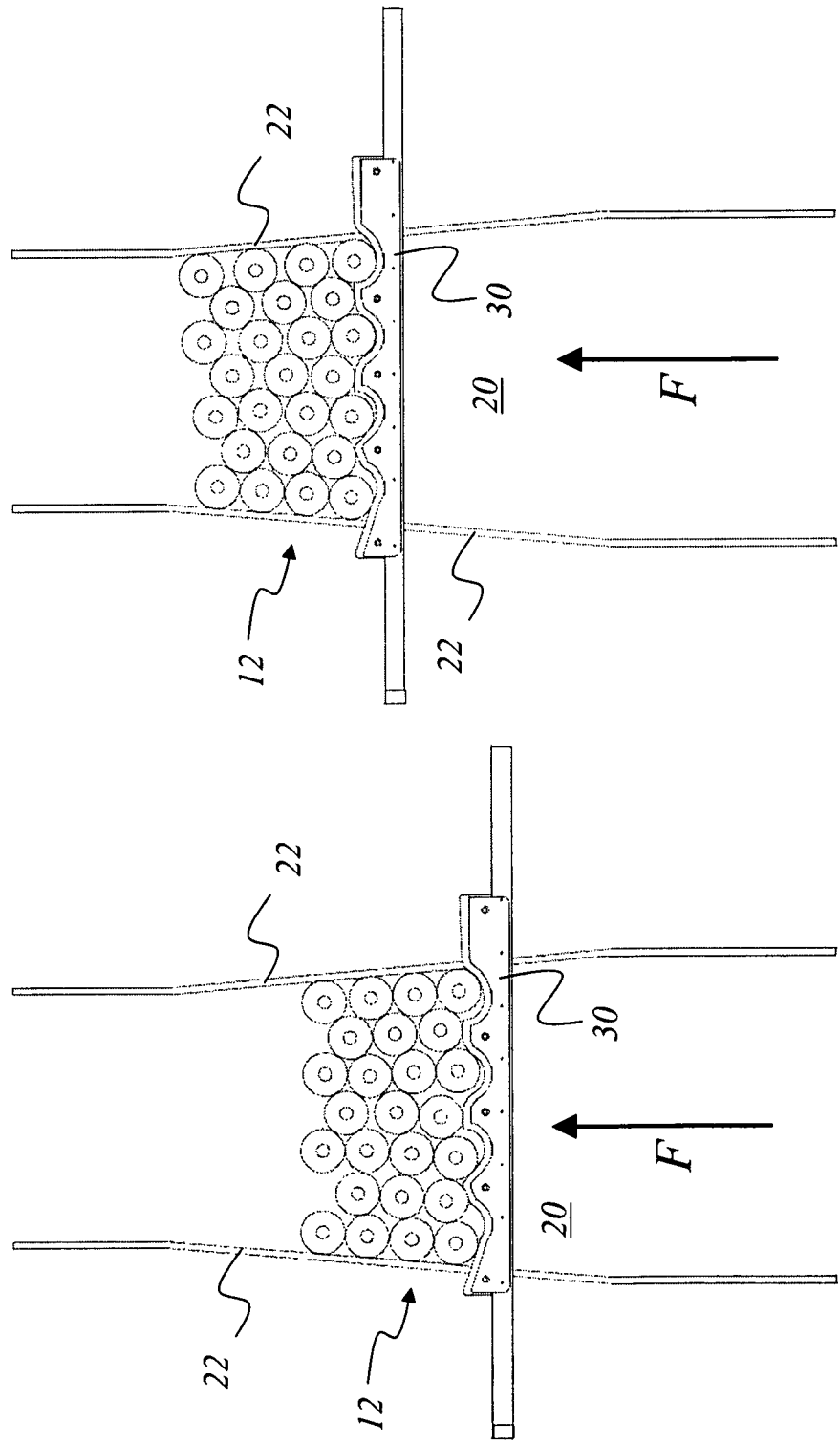

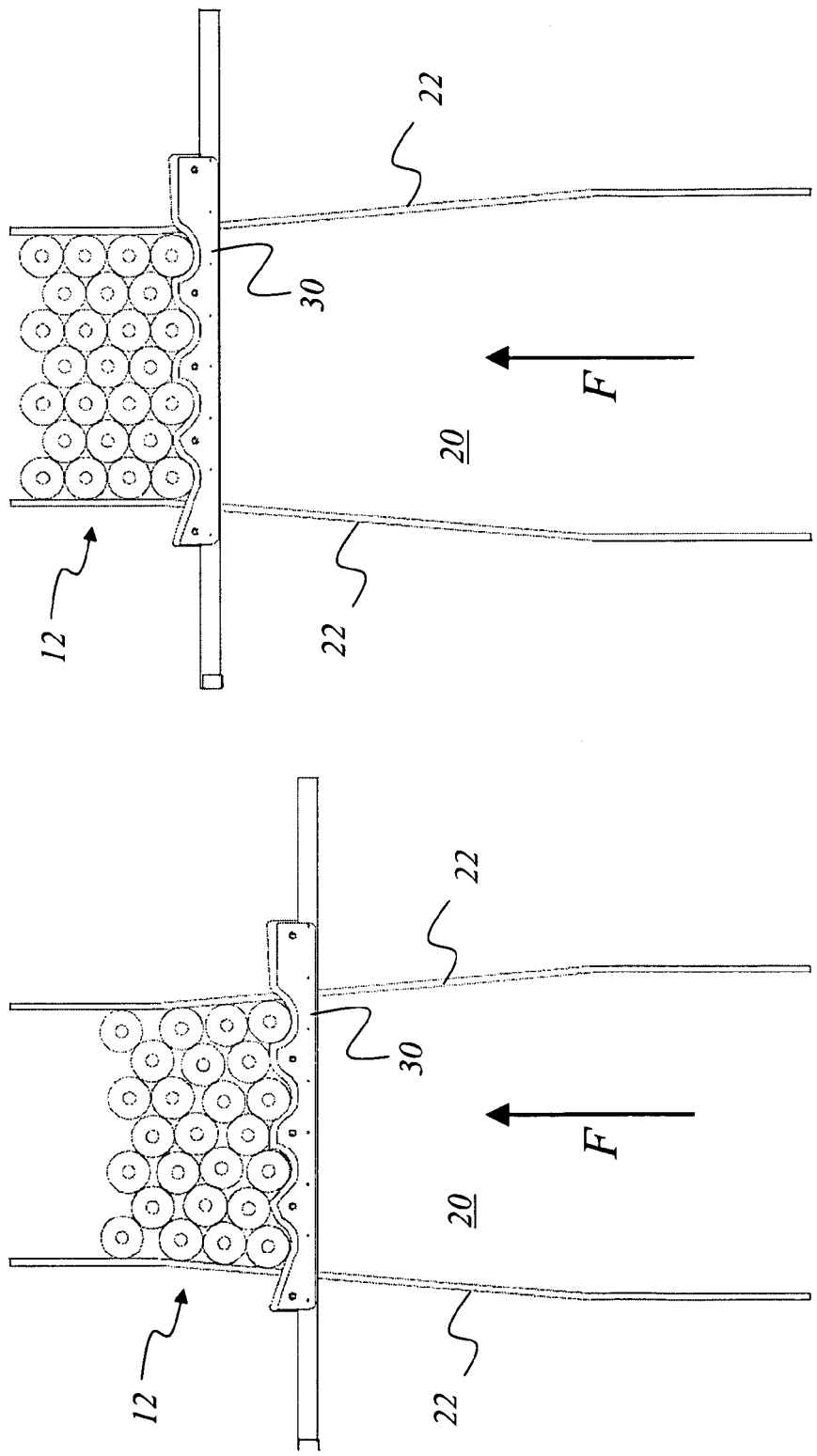

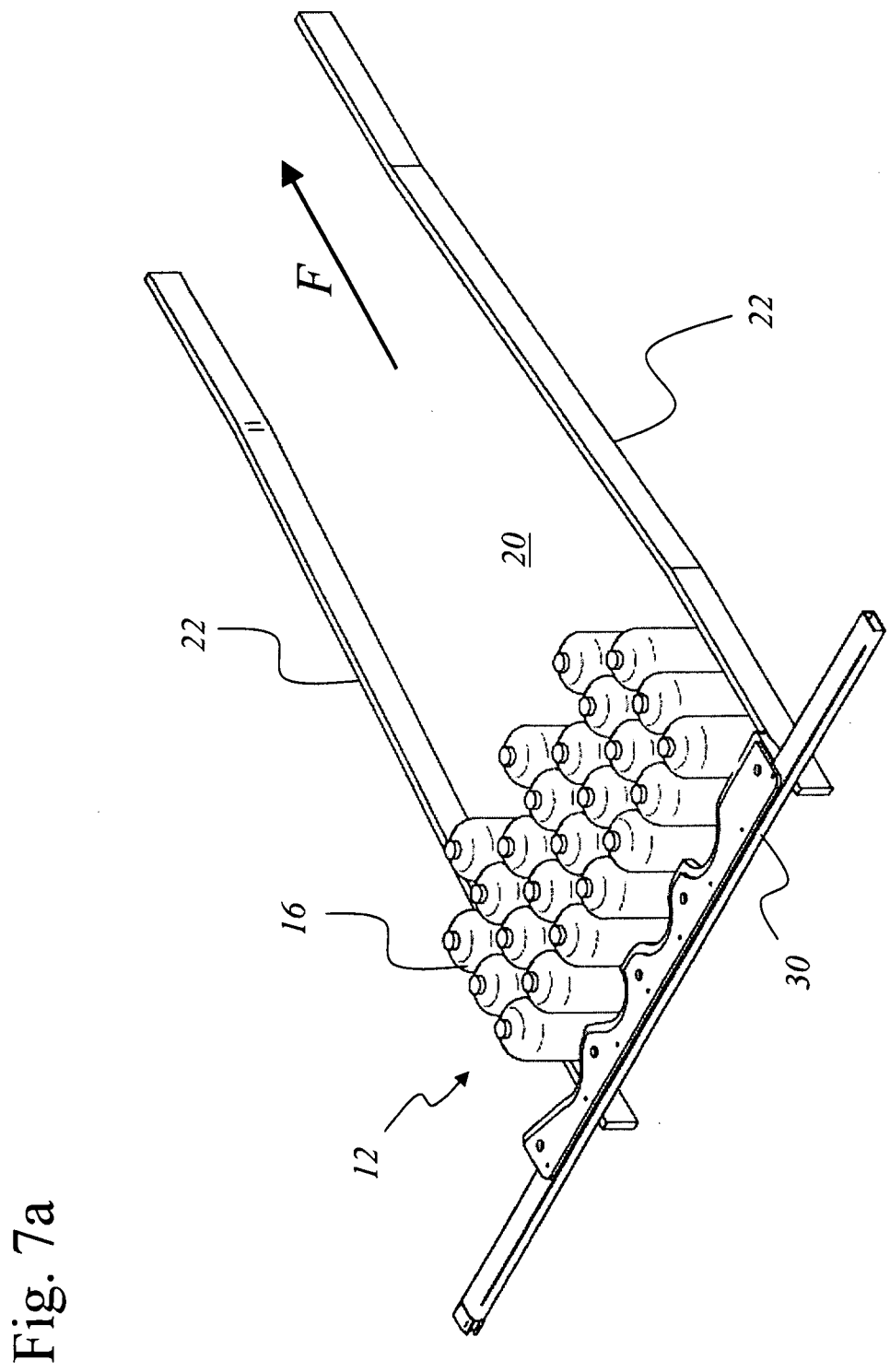

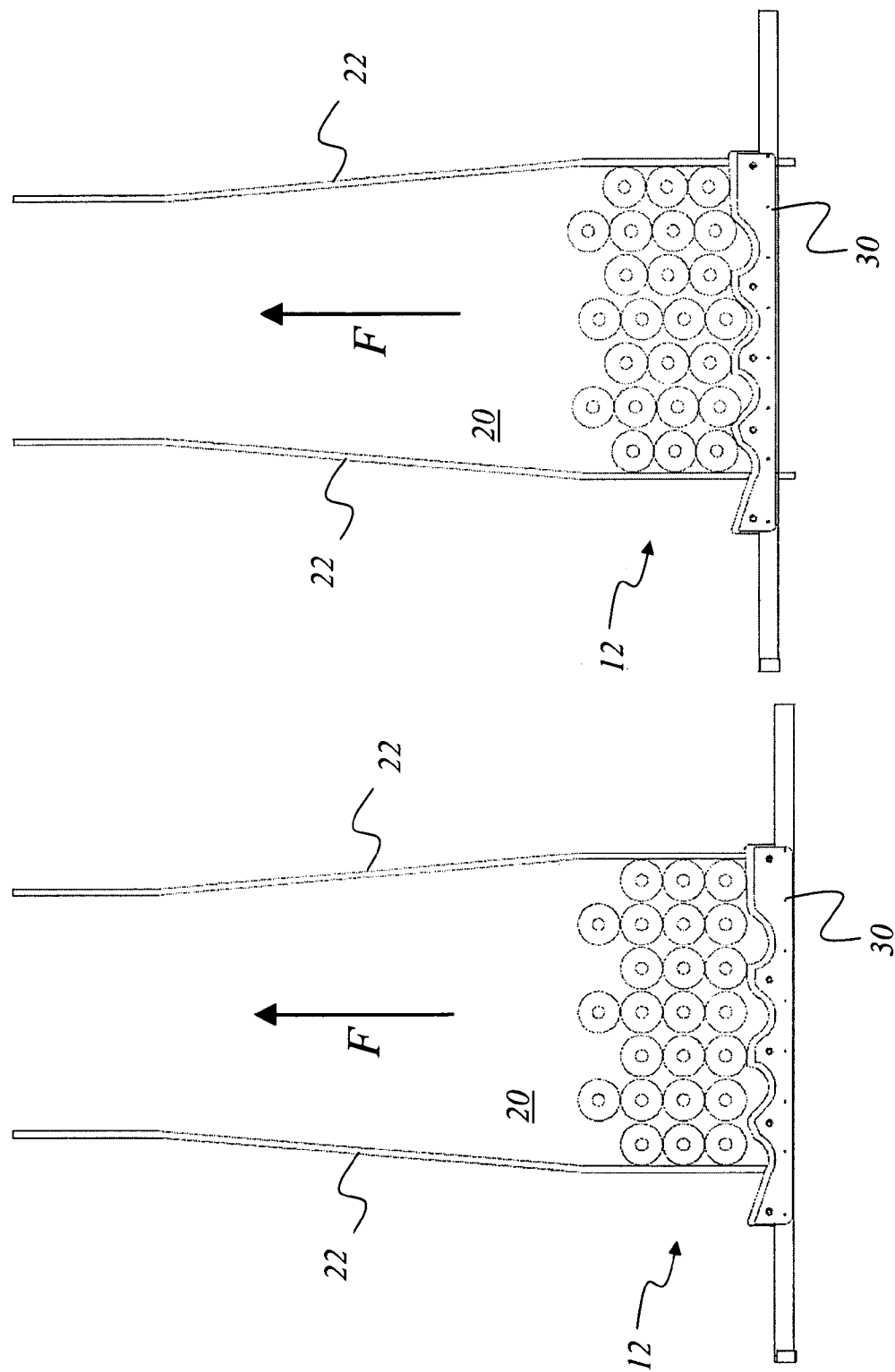

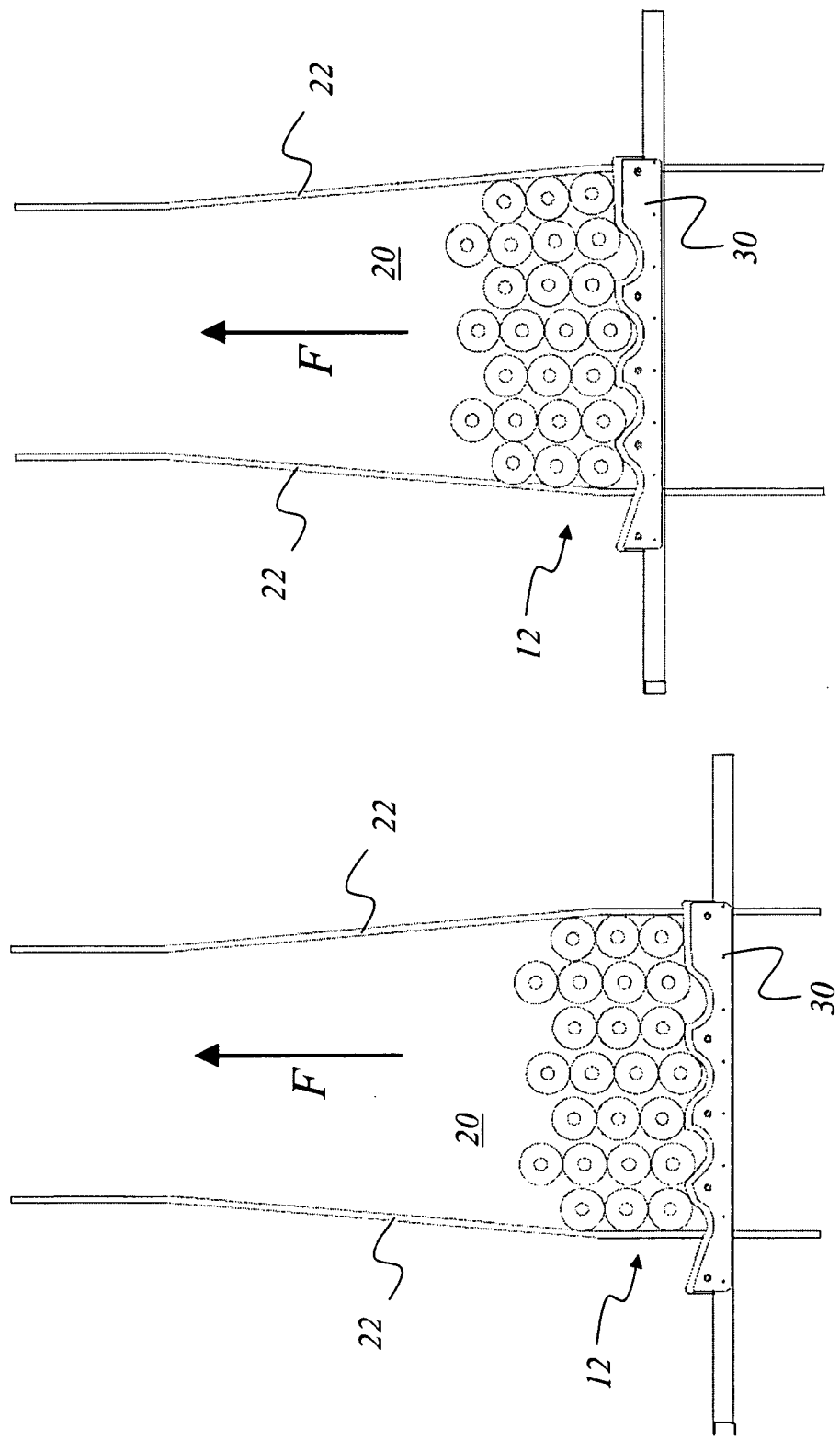

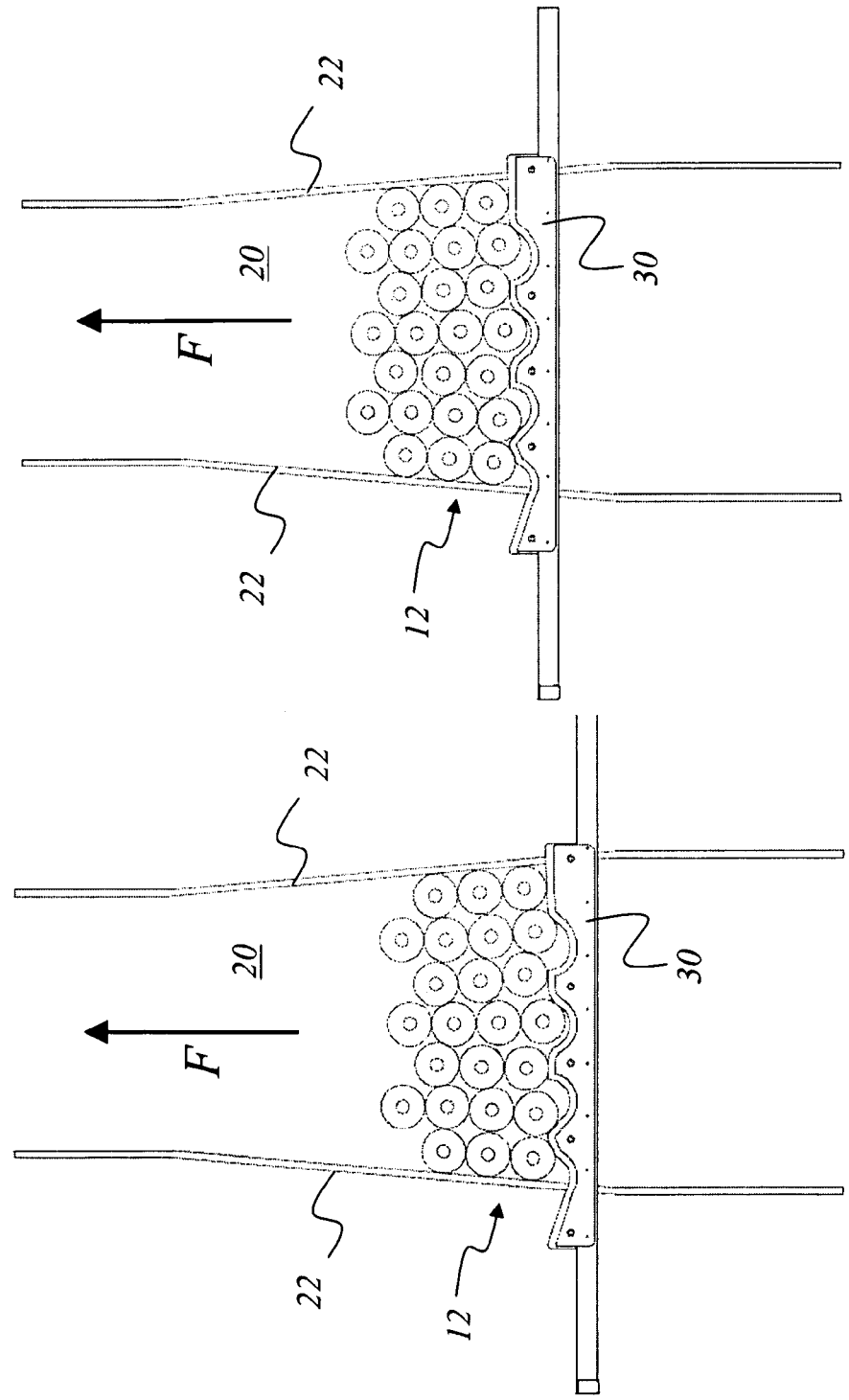

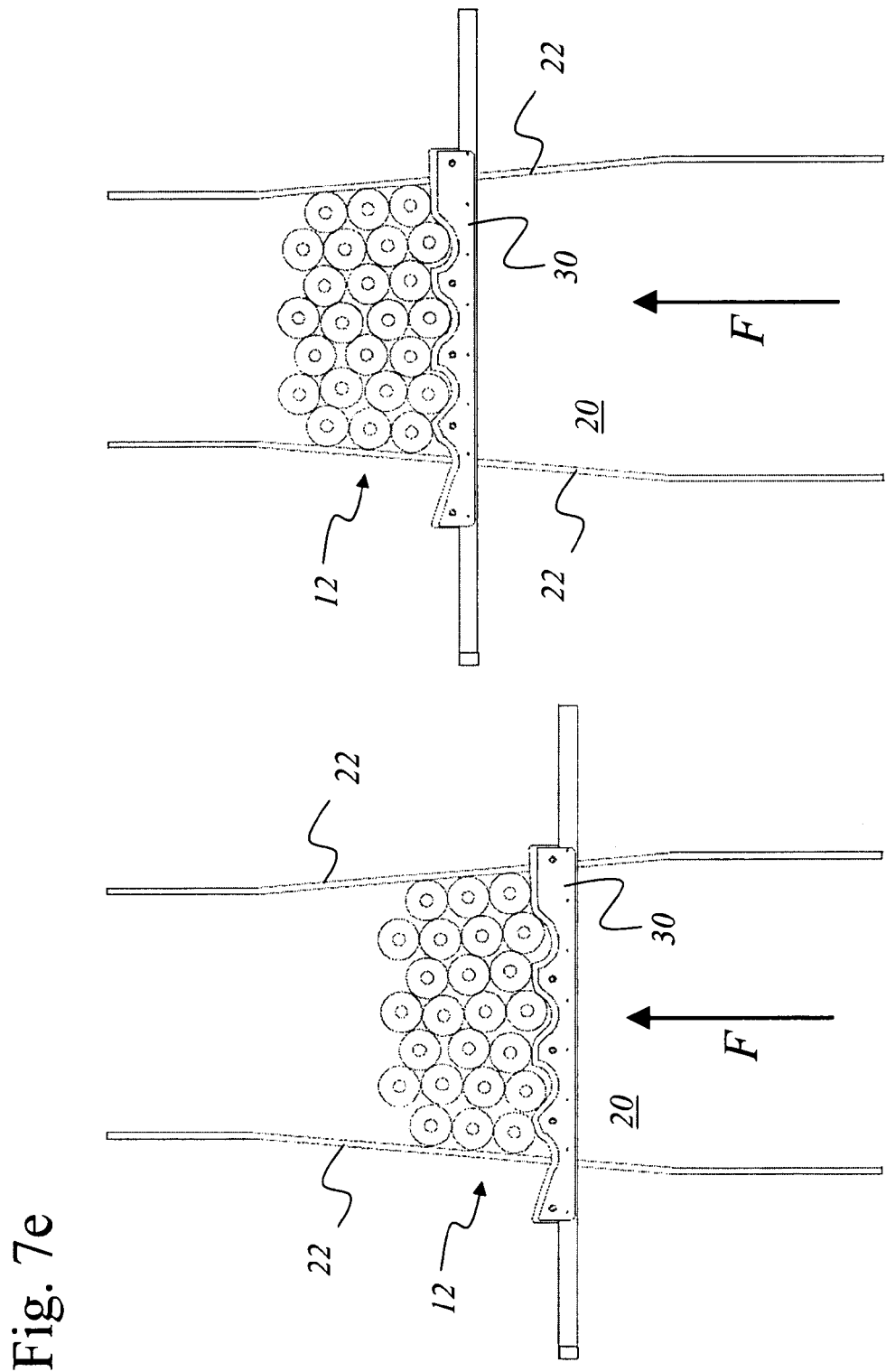

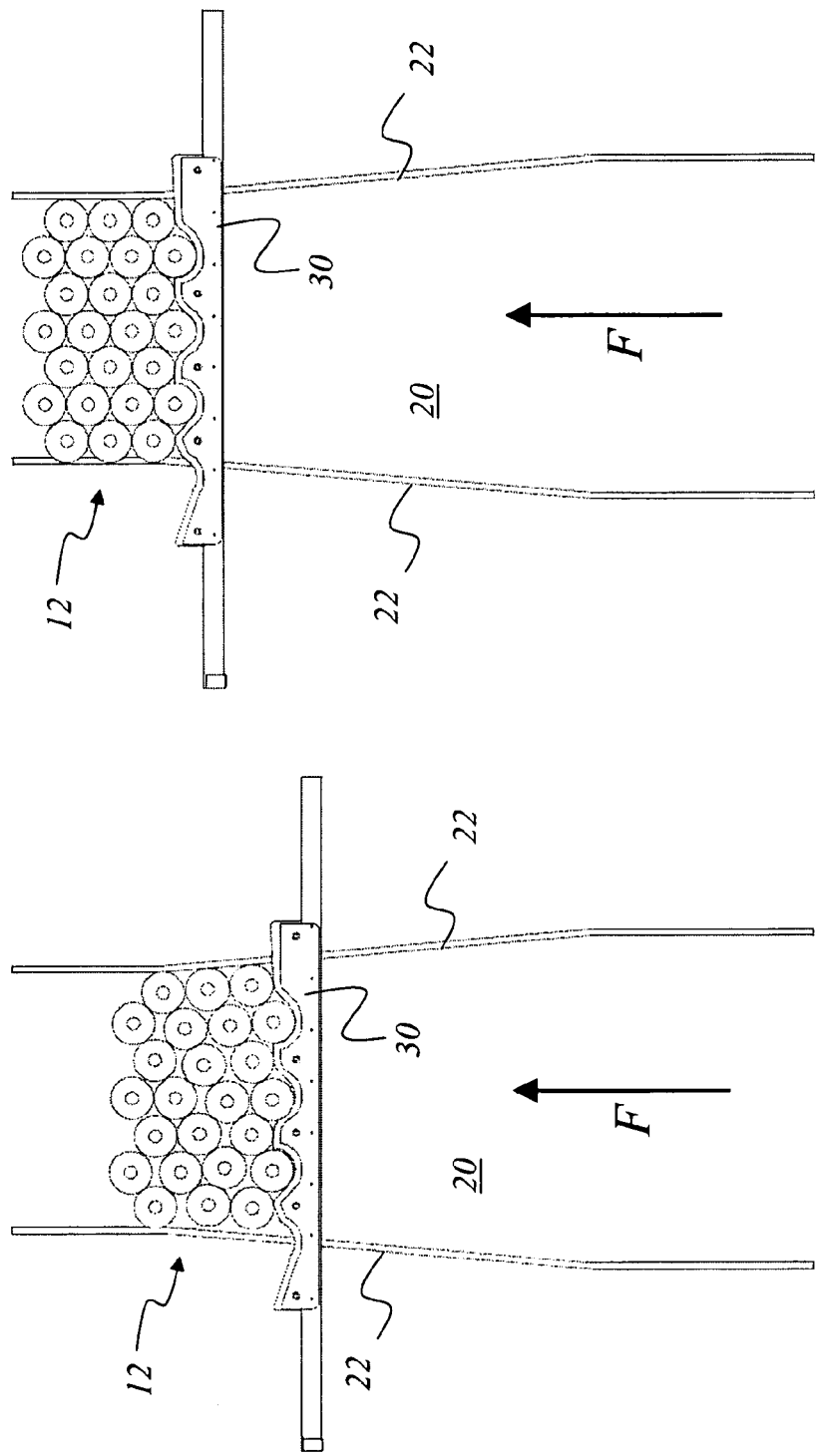

METHOD AND DEVICE FOR FORMATION OF GROUPS OF ARTICLES TO BE PACKAGED AND A PROFILED THRUST BAR TO USE FOR THIS PURPOSE

This claims the benefit of German Patent Application DE 10 2010 033 549.5, filed Aug. 5, 2010 and hereby incorporated by reference herein.

The present invention relates to a method for formation of groups of a plurality of the same type of article to be packaged, in particular cylindrical articles, such as drinks containers, bottles, cans or similar items in a nest like arrangement. The invention furthermore relates to a device for implementing the method required to create groups of a plurality of the same type of article to be packaged. The invention furthermore relates to a symmetrical or asymmetrical profiled thrust bar for transformation of a group of articles being conveyed in a horizontal direction into a compacted arrangement.

When handling and packaging containers they are often grouped together into bundles with a large number of regular container compound arrangements standing next to each other which are subsequently wrapped in shrink foil and in this way firmly held together for later transport and storage. In order to arrange containers which have a cylindrical or near cylindrical cross-sectional form, such as drinks cans or drinks bottles, using as little space as possible and with as little freedom to move relatively to each other as possible, it is meaningful to form a so-called honeycomb or ball compound structure which can be designated as a nested arrangement. In so doing the containers are respectively offset in rows relative to each other in such a way that the gaps created between the containers are as small as possible. Such a honeycomb or ball arrangement represents a compound structure of a given number of containers with the smallest possible floor area.

In order to obtain such a container compound arrangement, the containers being transported in a plurality of rows, for example rows which are separated from each other by means of lane separators, are brought closer together by means of suitable guiding devices so that an offset arrangement of the respective neighbouring rows of one half of a container diameter is achieved in the direction of transport as is known, for example, from U.S. Pat. No. 2,535,880 A. In this known conveying device the containers are conveyed respectively without any gaps in seven parallel rows until they reach a deflection zone at which the outer lying guiding plates are bent inwards and thereby deflect all of the rows except the middle one so that the containers are pressed together. The subsequent common conveying lane for the seven containers arranged offset to each other has a total width which represents that of the pressed together and offset to each other conveyed containers. The fact that that no other aids are provided means that this type of container deflection involves the risk that collisions and unwanted formation of gaps can occur.

There were various variants known to achieve targeted movement of individual rows of containers. Thus U.S. Pat. No. 3,724,639 A provides for a symmetrically profiled element which intervenes at the same time on transverse rows of bottles and moves them vertically towards the transport device by the desired amount in order to achieve the desired offset arrangement of the bottles. U.S. Pat. No. 6,490,845 B1, on the other hand, provides for movement of every second row in the direction of transport in order to achieve the desired offset arrangement. The special feature here is that the containers can be assigned in a particular way to a group of containers. The assignment provides for the outer two rows of containers of the group of containers to have one more container each whereas the inner three rows have one container less. To do this there are circulating rods provided with rollers of an appropriate diameter arranged on them which come into contact with the respective previously grouped row of containers as seen in the direction of transport from the rear in order to move each second row by a certain amount in the direction of transport before the grouped containers arrive at a narrowed area in which they are push together transversely to the direction of transport, whereby the desired spherical packing is achieved. The disadvantage with this arrangement is the lack of security that the front-most container of each second row is exactly at the desired position, that is, that it moves towards the third row. Furthermore, the functionality of the bundle variants to be created (6×4 or 8×4) would be limited for firmly fixed rollers located on the rods.

In order to reduce these limitations and to allow processing of different sizes of bundle groups, a prior art system is known from U.S. Pat. No. 7,726,464 B2 for which the narrowing of the transport route is, however, achieved over a longer transport route. There are also rollers arranged on circulating rods provided in order to move the rows of containers in an alternating fashion in the direction of transport by an amount which approximately represents half a container diameter but which can also move in the longitudinal direction of the rods in order for containers which should be moved sideways relative to each other to follow the container movements transverse to the direction of transport during their contact with the containers along the transport route. To achieve this, the rollers are moved together by the guide plates in such a way that they can exactly follow the respective positions of the containers on the narrowing transport route. The disadvantage of this embodiment, however, is the complex construction of the guide plates, the necessity to ensure the starting arrangement of the rollers on the rods as well as the required disassembly and re-assembly every time there is a change in the desired bundle format. The system is also not resistant to dirt which can easily lead to the situation where the rollers are blocked in their direction of movement and can therefore contribute to a malfunction or even a machine standstill.

The purpose of this invention is to make a significantly simpler, cost effective and reliable method available together with an appropriate device for compacting groups of upright standing articles by means of which they are brought into a tight, compacted arrangement during their transport. One further purpose of this invention is to make a pushing element available which can support the largely fault-free and reliable device during creation of such a compacted arrangement of the groups of articles.

In order to achieve these tasks this invention suggests a method for formation of a compacted or nested arrangement of articles to be packaged which are sub-divided into group, preferably as a plurality of rows of articles arranged one after the other within a packaging machine, in particular identical cylindrical articles such as drinks containers, bottles, cans or similar items, whereby the group of articles comes into contact with and is guided through the packaging machine by means of at least one symmetrically or asymmetrically profiled rail in the direction of movement, at least in a partial section of the transport route, in particular in a tapered area along the side walls in the direction of transport, which come into contact with a end face of the group of articles, in particular on the rear side of the group of articles as seen in the direction of transport and, in this way, that at least some of the articles in the group are pushed together into the compacted or nested arrangement. The partial section of the transport route with the tapered side walls can optionally have a contact face for a smooth sliding thrust motion of the articles which are moved in the direction of transport by means of the symmetrically or asymmetrically profiled thrust bar coming into contact with the rear side of the group. This means that the whole group executes a gliding movement of the articles on the said partial section in such a way that the transport movement forward is primarily only due to the pushing movement of the symmetrically or asymmetrically profiled trust bar so that their profiling can ensure the desired movement of the articles into the compacted nested arrangement.

The articles to be compacted together can be arranged, in particular, in a plurality of rows of articles one after the other, for example in a regular N×M arrangement (N articles in each of the M rows located next to each other). The articles can, in particular, be of the same type and of an identical contour and shape. However, the method is also fundamentally suitable for moving differently formed and/or dimensioned articles. When one speaks in connection with this description of a nested or nesting arrangement, one is basically referring to a compacted arrangement of the articles which are located offset to each other to reduce the gaps between them, for example in a so-called honeycomb arrangement. To do this is it is necessary to have articles with which do not have quadratic or rectangular bases surfaces, for example cylindrical articles or those with have hexagonal or octagonal bases surfaces, which can be brought into a compacted arrangement. The overall area covered by the article arrangement to be compacted is therefore reduced compared to the original standing area of the regularly arranged rows of articles located next to each other. This compacted or nested arrangement of the articles not only offers the advantage of reduced volume and area requirements but also contributes to the mechanical stabilisation of the bundling arrangements, when these, for example, are packed with strapping or with shrink foil and grouped together as bundles. The articles which are pushed together and are ultimately in a honeycomb or nested form stabilise each other since their outside surfaces support each other.

For this method it is possible to make provision that the articles are transported in a plurality of parallel single rows separated from each other in a horizontal direction and are transferred to an area tapering along the side walls without lane separators in the direction of transport. In this area each group of a plurality of articles is brought into a compacted or nested arrangement by means of at least one profiled thrust bar moving in the direction of transport acting from the rear of the group through offsetting or shifting movements of the articles relative to each other in a plurality of directions. The variants described of the method according to the invention provide for a combined transformation of the articles previously transported in regular rows into a tight and particularly space-saving packaging arrangement for which the articles are initially transferred into an area without the so-called guiding devices which gradually tapers until the width of the transport lane only allows the desired compaction density, also known as the nested arrangement, due to the walls being moved inwards from the sides. Transformation of the articles into the desired arrangement relative to each other is also supported in a creating order by the symmetrically or asymmetrically profiled thrust bars which come into contact with the respective group from behind as seen in the direction of transport and push the previously regular or irregular and parallel rows of transported articles in such a way that the rows are each pushed by a defined longitudinal distance or into the desired position in the conveyor. Through this action the desired defined or nesting arrangement of the respective group of articles is achieved.

When one speaks in this connection of at least one thrust bar this includes a single thrust bar designed with suitable profiling which comes into contact with the row of articles and places and pushes it in the required way. However, by definition, the thrust bar can also consists of a plurality of parts whereby the two or more parts each have a profiling and can be moved relative to each other in the direction of transport or transverse to it. The profiling of a multi-part designed trust bar can, for example, create a sum or an intersection of sets from the approximate start and end position of the row of containers. This desired overall profiling can optionally be created by having beam-like individual profiles arranged one above another which can be moved in an opposing manner perpendicular to the direction of transport in order to obtain the desired compacted arrangement. One meaningful variant can also provide for a pair of thrust bars which can be moved in an opposing manner in the direction of transport and can be moved alternately relatively to each other according to the current position in order to obtain the desired article arrangement.

The reference above to regular rows should not in any way be understood as a limitation since the method can also separate irregularly arranged rows and bring them into the desired nested arrangement. Such a grouping of articles can, for example, occur in that a row of six consecutive containers is in the conveyor and a neighbouring row only contains five containers and the following row again has six containers etc. and thus together create a nested formation.

When one speaks in this connection of symmetrically or asymmetrically profiled thrust bars one is referring to thrust bars whose front edge is profiled the same (symmetrically) or differently (asymmetrically) on both sides in relation to an upright standing centre plane or in relation to a centre plane aligned in the direction of the thrust, whereby this profiling corresponds with the outer contour of the group of containers or articles being pushed into the nested arrangement. One would select an asymmetrical profile for the majority of applications since this allows targeted movement of the articles. One should, however, emphasize that the method according to the invention can also be implemented using regularly formed, that is a symmetrically profiled thrust bar. One can indeed say that use of an asymmetrical profiling is preferred.

In an alternative embodiment of the method according to the invention the partial section of the transport route with tapered side walls does, by contrast, have a transport plane with a movable contact surface for upright transport of articles. It is not essential in this case to have a thrust bar come into contact within the group from behind but rather one which comes into contact with the front side of the group, designed as a symmetrically or asymmetrically profiled stop bar to slow down the profiled bar acting on the group which slows down the movement of individual articles of the group counter to the direction of transport and, at the same time, also produces the desired nested arrangement due to its profiling. In this way this variant of the method ensures that the front articles of every group adjust their position to the contouring of the stop bar along the tapered area through meeting the symmetrically or asymmetrically profiled stop bar and are pushed into the nest-like arrangement.

When one speaks in this connection of groups of articles then these can, for example, be drinks containers or bottles, but also cans or other containers which at least have a cylindrical or nearly cylindrical container cross-section. When one further speaks of parallel rows of articles then these can be two, three or more of the same type of rows which are being conveyed in a parallel direction and arrangement, in particular by means of conveyor belts, mat top conveyors or similar equipment. A very compact bundle should be made out of these parallel rows with the aid of this method according to the invention which can subsequently be held together without use of any other holding devices just by using foil or horizontal strapping tightened around the group of articles. The articles can typically be wrapped in shrink foil which is tensioned firmly over the group of articles through the action of heat, whereby an easy to transport, stackable and easy to handle bundle or shrink-wrapped pack is produced.

The method according to the invention can provide for the rear container in the conveyor of each group being placed alternately in the respective neighbouring longitudinal row, offset in the direction of transport by means of the symmetrically or asymmetrically profiled thrust bar moved in the article conveyor with the support of the tapered guide bars which move the articles relative to each other, perpendicular to the direction of transport, and therefore bring the articles into a spherical packaging arrangement which matches the desired nested or nesting arrangement of the articles.

The thrust bars and/or stop bars used optionally for the method according to the invention serve to achieve targeted movement of individual rows of a group made up of one or more rows transported beside each other, either in or against the direction of transport. To do this the thrust bars, which are applied respectively from the rear to the groups, each have a suitable profiling which represents the contour of the desired outer contour of the group of articles. In this way the rearmost articles of each group, upon meeting the symmetrically or asymmetrically profiled thrust bar during their movement along the tapered area, adjust to the contouring of the thrust bar and are pushed into the desired nest-like arrangement in which the gaps between the articles are minimised. This nest-like arrangement is similar to a honeycomb-type arrangement of the articles.

In an alternative use of stop bars which come into contact with the front sides of the groups, these stop bars also have a suitable profiling the contour of which represents the required outer contour of the group of articles. In this way the front-most articles of each group adjust to the contour of the stop bar upon coming into contact with the symmetrically or asymmetrically profiled stop bar during its movement along the tapered area and the articles are pushed into the desired nest-like arrangement in which the gaps between the articles are minimised. In this variant the articles are moved in a horizontal direction by the conveyor, pressed on, moved and offset by the tapered lateral guide bars and also, at the same time, brought into an exactly suitable location and arrangement by the stop bar so that a packing density without any gaps in a nested arrangement is formed. After moving the articles, the front-most article in a row seen in the direction of transport lies in a depression on the asymmetrically profiled stop bar so that the front article as seen in the direction of transport of a neighbouring row lies on a projection on the stop bar. As mentioned before, the depressions and the projections are located alternately so that the desired nested arrangement of the articles is given by the profiling and the outer contour of the stop bar.

The fact that the desired nest-like arrangement means a dense packaging arrangement of the articles means that movement of the outer row of containers for the respective group is necessary which is primarily achieved by the tapered conveying lane with the narrowing lateral guide bars. Because of this tapered conveying lane the articles not only experience a longitudinal shifting in the direction of transport triggered by the thrust bars or slowed down by the stop bars while being moved but also a transverse movement of individual articles with a movement component which is perpendicular to the direction of transport. This movement component at the side effects the outer rows which are moved in the direction of the middle row, but not however this middle row, which can mostly maintain its position on the lane unchanged. There is reduced shifting of the articles towards the centre which can, in particular, occur equally to both sides.

The thrust bar should be conveniently designed in such a way that, after moving the articles, the rearmost articles of a row viewed in the direction of transport lie in a depression on the asymmetrically profiled thrust bar and the rearmost articles of a neighbouring row viewed in the direction of transport lie on a projection of the thrust bar. This profiling of the side of the thrust bar which is pointed towards the group of articles can, for example, be created by a wave profile or by a jagged profile, optionally with rounded off peaks. The same also applies for the stop bars which operate against the transport movement in a longitudinal direction of the groups of articles to be sorted and shifted. It is also optionally possible to provide that at least one of the rows of articles to be moved experiences transverse movement components provide by means of a moveable element mounted on the thrust bar. This moveable element mounted on the thrust bar or the stop bar can, for example, be a sprung bracket or bar or a similar item which can support transverse shifting of the articles by the sprung mounting around a vertical axis. It is also possible to optionally provide for a plurality of such movable elements on the thrust or stop bar, also in a symmetrical arrangement if necessary.

The invention also suggests a device for implementing the method for creating a compacted or nested arrangement of the same type or different types and/or identically dimensioned or differently dimensioned articles to be packaged within a packaging machine, assigned to groups, preferably arranged in a plurality of rows of articles placed one after the other, in particular cylindrical articles such as drinks containers, bottles, cans or similar items according to one of the previously described embodiments. This device includes a transport route for the group of articles for which at least a partial section on the conveyor tapers along its side walls. Furthermore there is an asymmetrically profiled bar provided which can be applied to an end face of the group of articles to transform the articles into a compacted or nest-like arrangement. This bar has a structuring or profiling pointing towards the group of articles which corresponds to an outer contour of a nest-like arrangement of the articles. The said bar can be made out of one part or many parts with a bar made out of two or more parts having a combined profiling which creates a sum profile depending on the movement of the parts of the bar relative to each other. The bars can be optionally designed as thrust bars so that the device according to the invention is a device for conveying the articles in a plurality of parallel single rows separated from each other in a horizontal direction as well one which can have a subsequent area tapering along the side walls without lane separators in the conveyor. There are also movable symmetrically or asymmetrically profiled thrust bars which can be moved to come into contact with the groups of articles at the rear, which can be moved in the direction of transport to transform the articles into a nest-like arrangement. These thrust bars each have a structuring or profiling pointing towards one of the group of articles which corresponds to an outer contour of a nest-like arrangement of the articles. As an alternative the bars can also be designed as stop bars whereby in this case the area without lane separators and with the tapered lateral guide bars must have its own drive for the groups in the conveyor so that the symmetrically or asymmetrically profiled stop bar which comes into contact with the group on the front side can ensure moving of the articles into the nested arrangement.

In order to respectively influence and to move the plurality of transported groups which are distanced from each other in the desired manner, each one of the groups must be assigned to a separate thrust bar or stop bar which circulate around in a movement synchronised with the conveyor moving the articles or which are brought into contact with the groups of articles. To achieve this it is possible, for example, to have a plurality of symmetrically or asymmetrically profiled thrust or stop bars mounted on traction elements which endlessly circulate at the sides along the transport route for the articles. Thus it is possible, for example, to have a plurality of bars assigned respectively at the side of the transport route, anchored to endlessly circulating roller chains so that the desired positioning of the bars and their synchronisation can be achieved by the movement of the chains and controlling of their circulation speed.

In addition to the variant with the symmetrically or asymmetrically profiled thrust bars engaging from the rear, it is still possible to have a stop bar which moves with the group along the conveyor to meet with the front-most articles at a front side for every group of articles. Also these stop bars can move along or be moved, in a similar way as the thrust bars, by means of endlessly circulating traction elements or roller chains in a movement which is synchronised with the transported articles. The stop bars primarily serve to maintain the bundle of articles since there is some risk of breaking away of individual articles out of the group to the front due to movement induced by the thrust bars and the tapered lateral guide bars of the transport route which could lead to malfunctions and hindrances during the later packaging and palleting operations, in particular if the broken away articles are either missing, are located at a wrong position in the bundle or even fall over, which can lead to malfunctions in the conveying and/or packaging stages.

In the same way, for a variant with a symmetrically or asymmetrically profiled stop bar engaging at the front and which slows down the flow of articles, there can be a retaining strip which moves along the conveyor with the group and comes into contact with the rearmost articles located at the rear side of every group of articles. Also these retaining bars can move along or be moved, in a similar way as the front stop bars, by means of a endlessly circulating traction element or roller chains in a movement which is synchronised with the transported articles. These retaining strips located at the rear also serve to maintain the integrity of the bundle of articles since there is some risk of breaking away of individual articles out of the group to the rear due to slowing down and transverse shifting by the stop bars and the tapered lateral guide bars of the transport route which could lead to malfunctions and hindrances during the later packaging and palleting operations, if for example the broken away articles are missing, are located at a wrong position on the bundle or have tipped over.

Further to the variants which have been described above there are also further conceivable combinations for which both a rear-located thrust bar and a front-located stop bar are used which each have a suitable profiling. The tapered area can optionally have a conveyor to transport the articles or a sliding surface for the pushing movement generated by the thrust bar.

Finally the invention includes a arrangement of a plurality of symmetrically or asymmetrically profiled thrust and/or stop bars which serve to transform the groups of articles being transported in a horizontal direction into nest-like arrangements. The symmetrically or asymmetrically profiled thrust and/or stop bars according to the invention each have a structuring or profiling pointing towards the group of articles which corresponds to an outer contour of a nest-like arrangement of the articles. The thrust or stop bars will each preferably have a wave or cam profile with alternating depressions and cams at a profile height which can be approximately half of the external diameter of the article or less. The alternating depressions and cams are also at a defined distance from each other which, at a maximum, can respectively represent an article diameter but which is preferably less than that. The profile heights and distances between the depressions and the cams depend on the desired article formation which should be created in this way.

The symmetrically or asymmetrically profiled thrust or stop bars according to the invention can each optionally be made up of a plurality of parts and have at least two bar parts moving relative to each other whose sum profile can be altered according to the relative position of at least two bar parts. The resulting profiling of the multi-part bar with bar parts moving relative to each other can be seen as an intersection of sets from the starting contour of the outline of the group of articles to be moved and the desired final contour of the bundle form after moving the articles into the compacted arrangement. The profile can also be seen as the result of an empirical consideration. A comparison is made here between the bundle form at the beginning and the bundle form achieved after moving the articles, whereby an average contour can be determined as a meaningful profiling. One important point in this connection is consideration of the movements made by the individual articles during their shifting, the collisions taking place, the sliding movements and the shifting movements with or to neighbouring articles, as well as meaningful and/or necessary obstruction of individual pathways in order to ensure that the movements can be executed in an effective way.

The thrust and/or stop bars according to the invention can optionally be designed as integral thrust rods or as individual parts with appropriate profiling which can be connected with a thrust rod and designed to be replaceable. For existing machines the thrust rods are often designed in the form of round rods (a pipe or solid material) or a rectangular pipe or rod. The thrust and/or stop bars according to the invention can optionally also be designed in such a way that the thrust and/or stop bars can, for example, be plugged onto or attached in a releasable manner to the existing thrust rod, or can be clipped off and on, screwed on or attached. Thus existing machines can, for example, be retrofitted with this inventive technology in order to create nested arrangements of groups of articles. The respective design of the existing thrust rod is irrelevant. It is just the intention to emphasise here that the thrust and/or stop bars according to the invention can also be attached as a replaceable retrofit kit to the existing thrust rod without necessity to invest into any major design work.

Furthermore it is optionally possible to attach a movable and/or manually adjustable and fixable guide element, moving against the force of a spring, on at least one side flank of a cam to apply side movement components to the movable rows of articles. It is also possible to provide more such adjustable or movable guide elements which are preferably movable in a way which can influence the shifting movements of the articles in a suitable way of the groups of articles coming into contact with the thrust bar or stop bar. The guide element is preferably anchored so as to be rotatable around a vertical axis on the bar.

It is also useful to mention at this point that the profiling of the thrust or stop bars which points towards the articles and provides them with their outer contour is generally designed as unsymmetrical to the centre plane, in particular for arrangements with an even number of rows of articles lying next to each other. The fact that the articles located at the side edges each make different balancing movements means that an unsymmetrical design of the flanks for the profiling is meaningful as will be made clearer in detail based on the following description of the figures. As mentioned above it is, however, also possible to use symmetrically profiled thrust or stop bars which, when designed appropriately, should also produce the desired results.

One advantageous variant of the arrangement according to the invention can provide for thrust bars located in pairs which can be moved relative to each other in the direction of transport and which can also optionally be each profiled differently. Thus one of the thrust bars can, for example, have profiling which approximates the edge contour of the original article formation or represents it while a further thrust bar located immediately above or below it can have profiling which approximates the compacted or nested article formation to be achieved. Such a arrangement of pairs of thrust bars can, alternatively, also provide for shift of both thrust bars of a pair in a horizontal direction transverse to the direction of transport of the articles. The flanks of the two bars which lie one above the other and which can be shifted in a horizontal direction are brought together as necessary to obtain the desired profiling. It should therefore be emphasised that the thrust bar with the profiling can fundamentally also be designed to be made up of a plurality of parts whereby the parts can be moved relative to each other. The resulting profiling of the thrust bar can be altered in this case during the formation process so that the articles can be moved in a targeted manner in a desired direction in order to finally obtain the target formation in which the pushed together articles are brought into a compact and compacted arrangement.

It is also useful to mention at this point that an embodiment of the invention can be provided with gliding support for articles which are moved by the thrust rod over a fixed stationary surface. Plate lubrication using water or another liquid can be provided, for example, in order to reduce the frictional resistance between the bottom of the articles and the sliding surface.

It is also useful to again mention at this point that the invention not only needs the asymmetrically profiled thrust and/or stop bar to function perfectly but equally also the tapered transport route for the articles along the path the thrust or stop bar is pushing the articles along in order to sufficiently move these together from the side so that there is not only dense packing of the articles together in a longitudinal direction but also in a direction transverse to the direction of transport or conveying. This section or conveying section for the articles which tapers or is constricted at the sides is particularly well explained and is understandable in the following description of the figures.

The invention will be explained in more detail below based on embodiments with reference to the attached drawings. The figures illustrate and clarify but not in any limiting way, the following embodiments of this invention concerning all of its details and functions.

Figure 1:
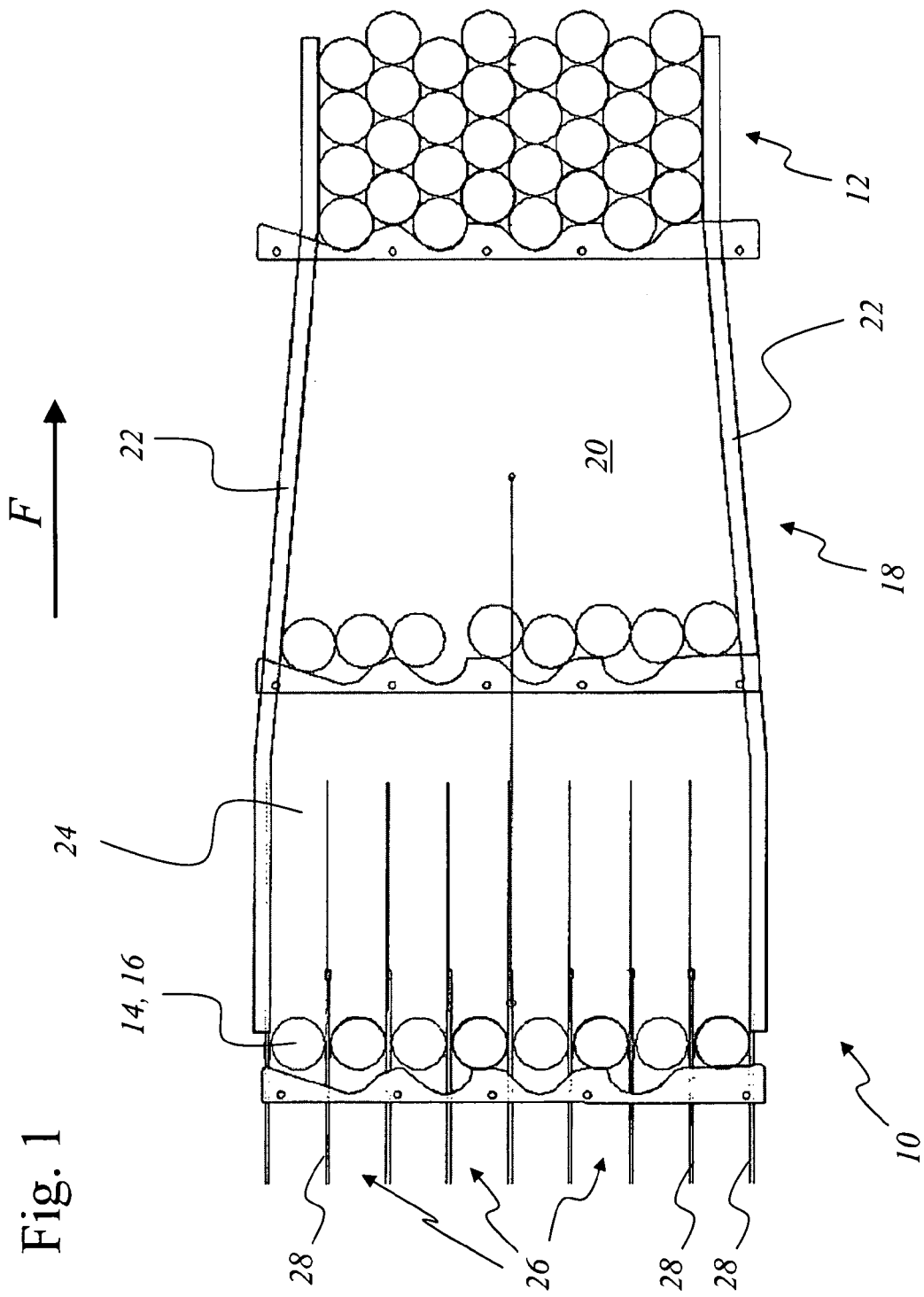
FIG. 1 shows a schematic view from above of an embodiment of a device for formation of a nested arrangement of grouped articles.

The following FIGS. 1 to 9 being described illustrate a plurality of embodiments or configurations of a device 10 for formation of a nested arrangements of identical articles 14 to be packaged which have been split up into groups 12 and which are in a plurality of rows located one behind the other within a packaging machine. These objects, which are generally designated as articles 14, are drinks containers 16 or bottles in an upright position in this embodiment, conveyed in a horizontal direction. The device 10 includes a transport route 18 for the group 12 of articles 14 or drinks containers 16 previously formed from a stream of a plurality of rows of articles, which tapers in a partial section 20 in the conveying direction F along its side walls 22.

As illustrated in the view from above in FIG. 1 the transport route 18 includes a horizontal conveyor system 24 or a mat top chain conveyor or a link chain or similar item to transport a plurality of articles 14 or drinks containers 16 side by side. The individual rows 26 are separated from each other by so-called lane separators 28 which are also located at the edges as outer borders so that the containers 16 can be conveyed in linear conveying direction F without come into contact with each other at the sides. An asymmetrically profiled thrust bar 30 is already introduced from behind the group 12 in the area of the horizontal conveyor 24 with the lane separators 28 provided to separate the articles. This thrust bar 30 takes over transport of the group 12 in the tapered partial area 20 since there is no further conveying floor present there but simply a sliding surface instead. It may be necessary to provide slide support in this tapered area constricted at the sides 20 for the articles 14 or drinks containers 16 pushed over the smooth surface by the thrust rod or thrust bar 30. Plate lubrication using water or another liquid can be provided, for example, in order to reduce the frictional resistance between the bottom of the articles 14 and the sliding surface of the area 20.

The asymmetrically profiled thrust bar 30 serves, on the one hand, to transport the group 12 over the partial area 20 tapered at the sides and, on the other hand, ensures that there is transformation of the articles 14 or drinks containers 16 into a compacted or nest-like arrangement by means of its special asymmetrical profiling and its contact with the rear face of group 12 of the articles 14, as is illustrated on the right in FIG. 1, for example as a so-called 8×4 arrangement. As illustrated in FIGS. 4 to 7, other arrangements can, however, be used in the way shown to bring the articles into the so-called nested arrangement.

The thrust bar 30 has a structuring or profiling 32 pointing towards the group 12 of articles 14 which in relation to a central axis (not shown here) running parallel to the conveying direction F or vertical upright central plane relative to the thrust bar 30 corresponds with an outer contour of the nest-like arrangement of the articles 14. As further illustrated in FIG. 1, every one of the groups 12 is assigned to a separate thrust bar 30 which circulate around the conveyor 34 in a movement which is synchronous with the articles 14 or which are brought into contact with the groups of articles 12. To achieve this it is possible to have a plurality of asymmetrically profiled thrust bars 30 mounted on traction elements 24 which endlessly circulate at the sides along the transport route 28 for the articles 14 in the form of circulating roller chains 36 so that the desired positioning of the bars 30 and their synchronisation can be achieved by the course taken by the chain 36 and controlling of its speed of circulation, as illustrated in FIG. 2 and FIG. 8.

Figure 8:
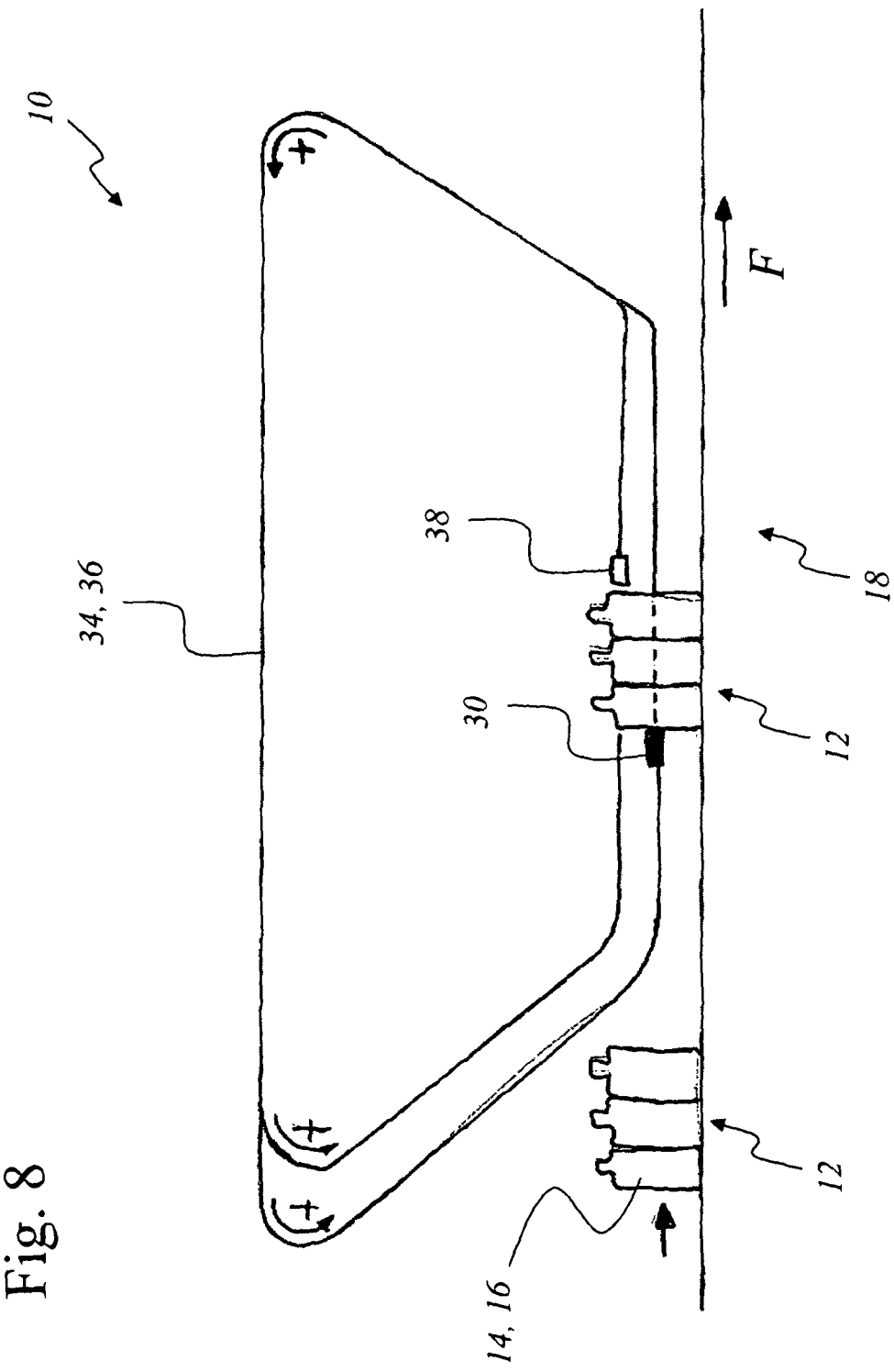
FIG. 8 shows a device for formation of a nested arrangement of grouped articles in a schematic side view.

FIG. 8 additionally shows that, in addition to the asymmetrically profiled thrust bars 30 making contact from the rear, there is a stop bar 38 travelling with the group 12 along the conveyor F which comes into contact with the front side of each group 12 of articles 14 to make contact with the front articles 14 of the group 12. Also these stop bars 38 can move along or be moved, in a similar way as the thrust bars 30, by means of an endlessly circulating traction element 34 or roller chains 36 in a movement which is synchronised with the transported articles 14.

The stop bars 38 primarily serve to maintain the integrity of the bundle of articles since there is some risk of breaking away of individual articles 14 out of the group 14 to the front due to movement by the thrust bars 30 and the tapered lateral guide bars 22 of the transport route, which can lead to malfunctions and hindrances during the later packaging and palleting operations, in particular if the broken away articles 14 are either missing, are located at a wrong position on the bundle or even fall over, which can lead to malfunctions in the conveying and/or packaging stages.

For the sake of completeness we wish to mention here that the groups 12 to be arranged are not shown in full in FIG. 1. Just the rear articles 14 are shown of the two left-hand groups 12 at which the thrust bars 30 make contact to push them while the already rearranged group 12 on the right is shown as the full, already compacted or nested 8×4 arrangement.

Figure 2C:
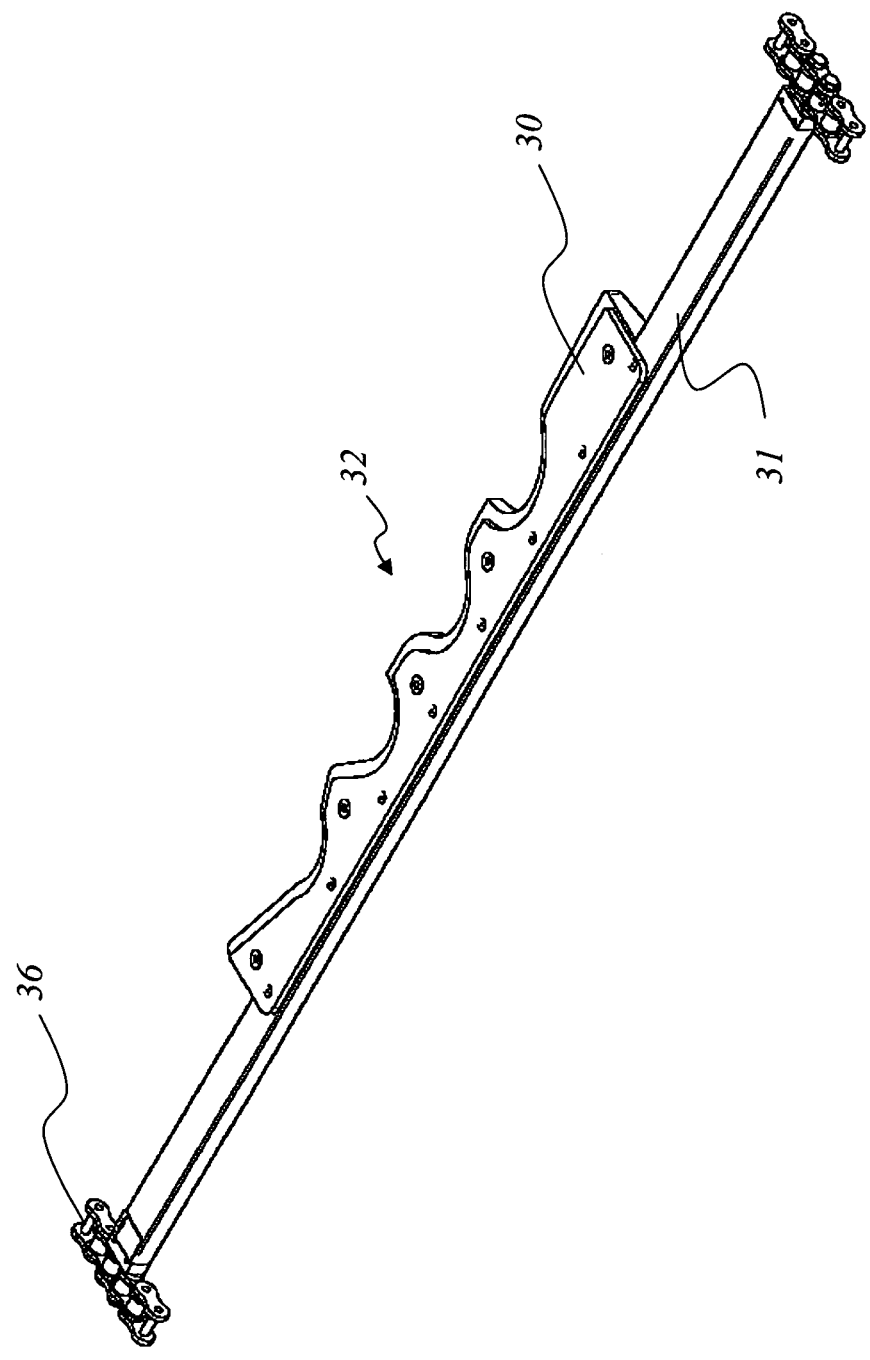
FIG. 2 shows a plurality of views of a thrust or stop bar for the device according to the invention according to FIG. 1
Figure 3A:
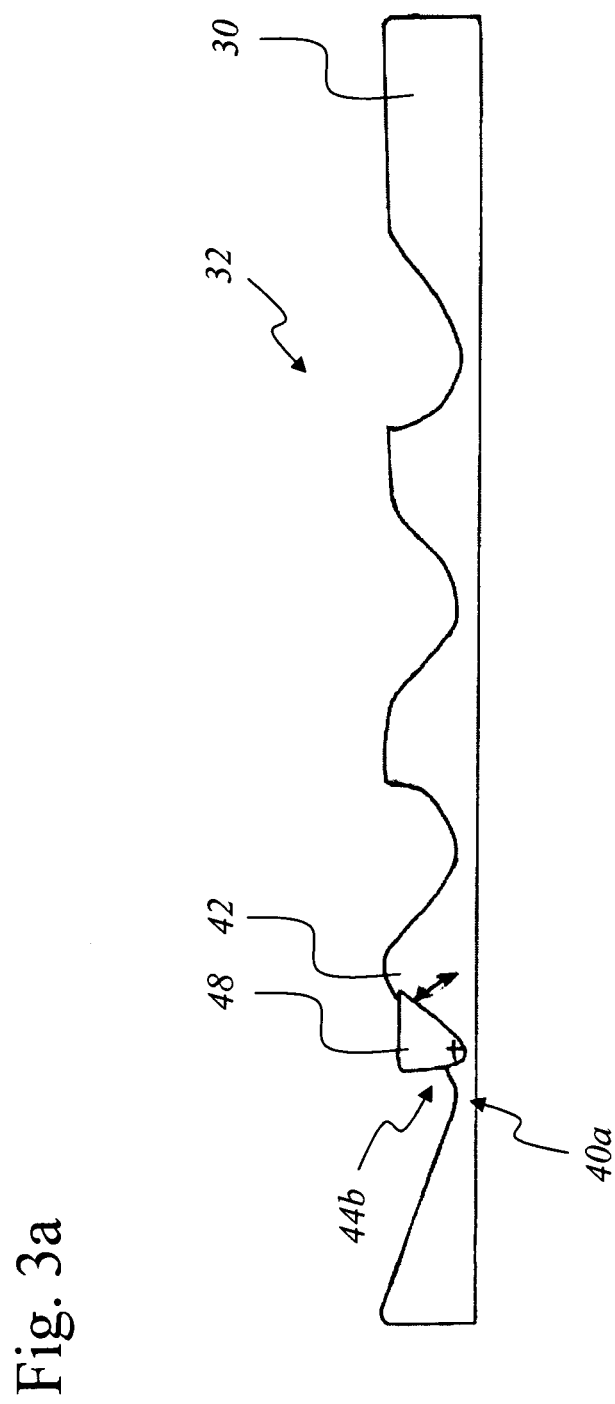
FIG. 3 shows a plurality of views of an alternative embodiment of a thrust bar the device according to FIG. 1.
Figure 3C:
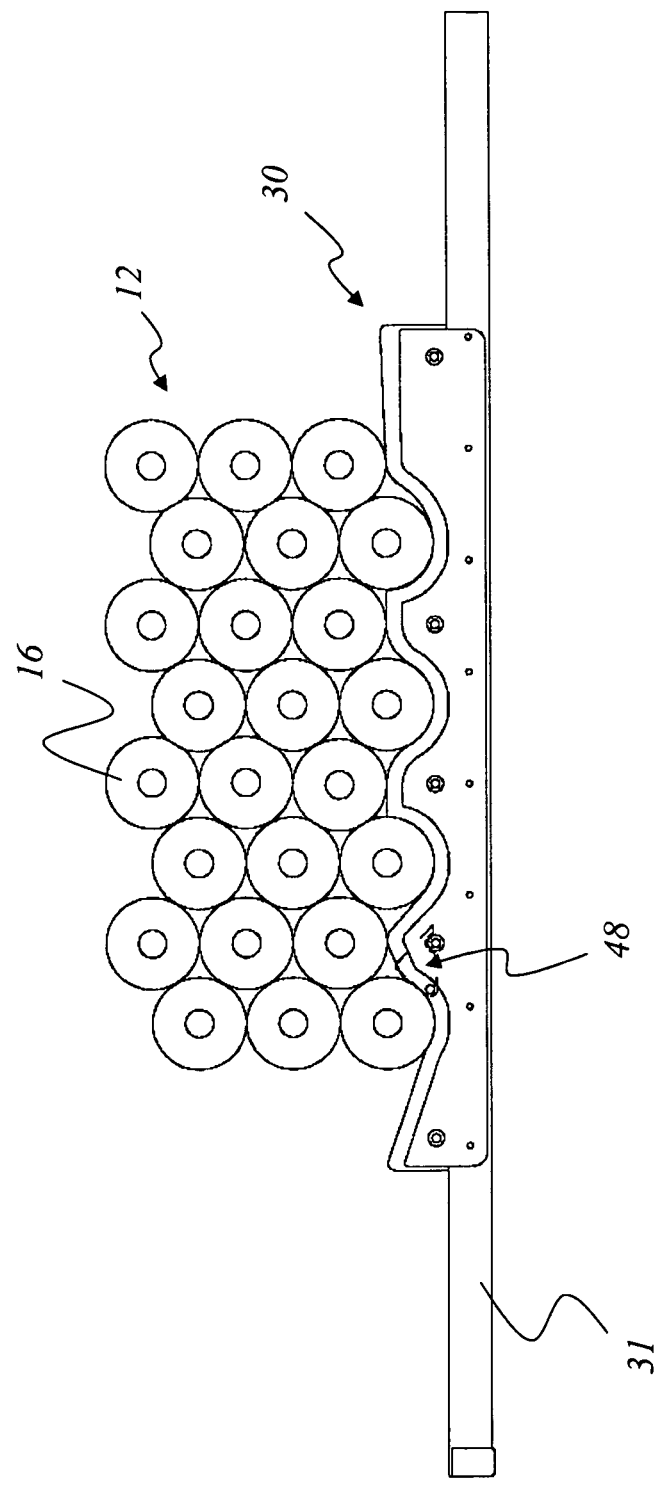
Figure 3D:
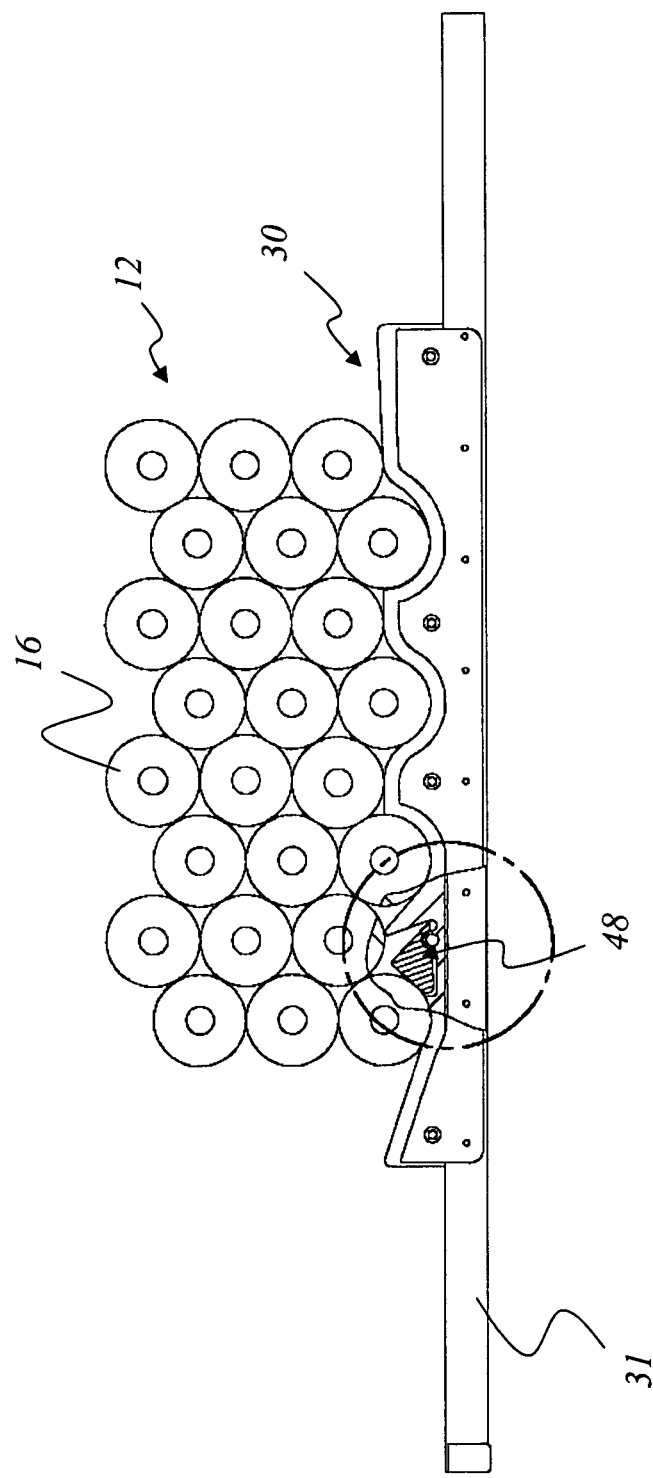
Figure 3E:
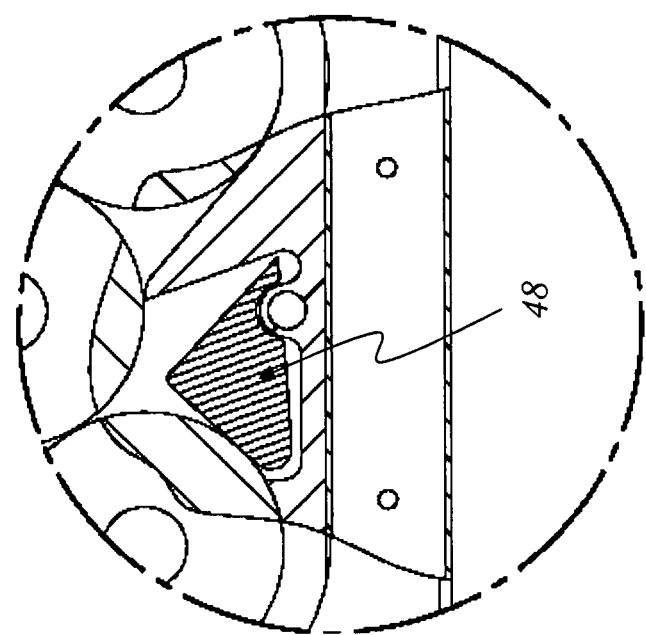
Figure 4A:
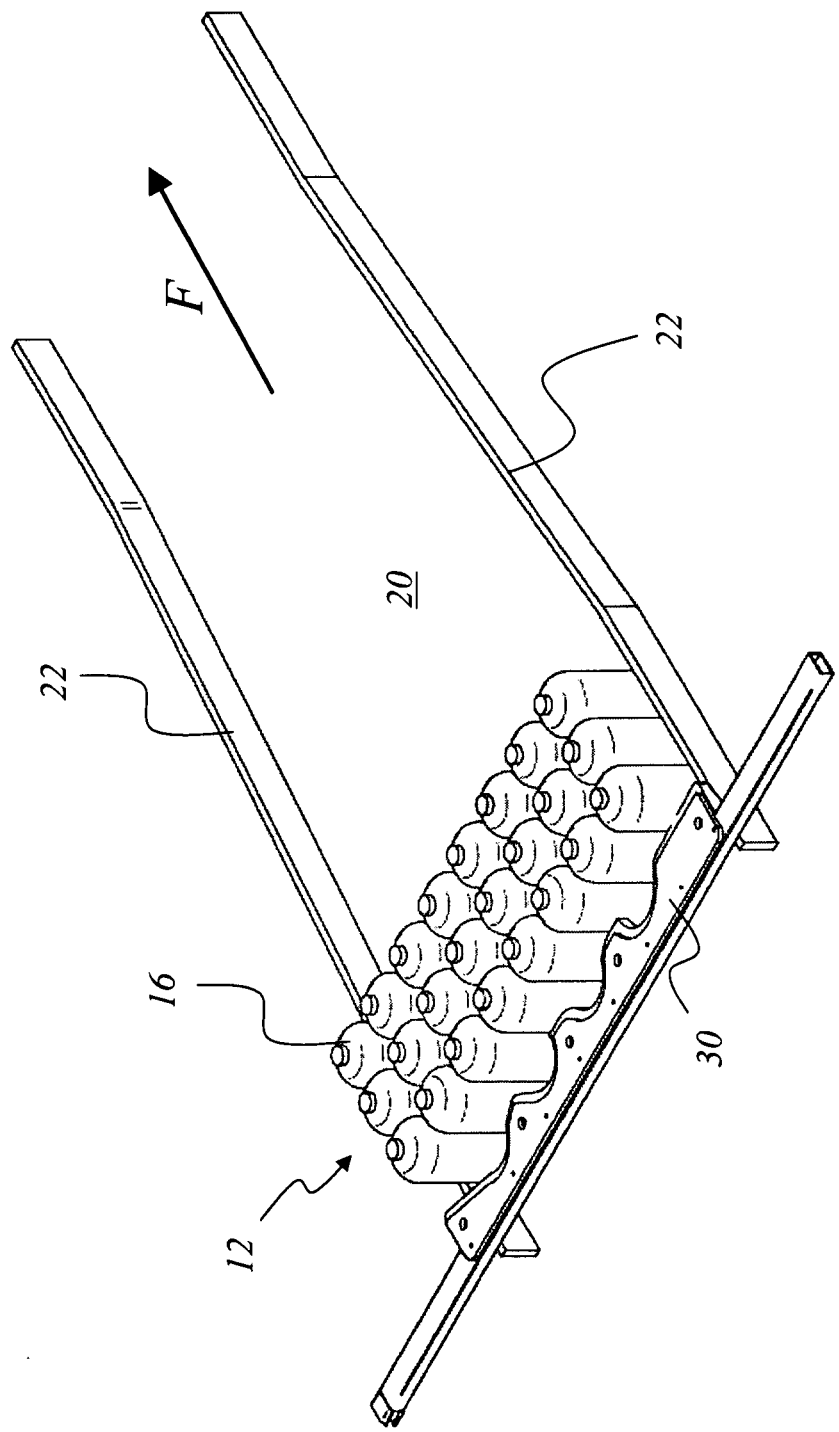
FIG. 4 shows in a plurality of schematic views the motion sequence for moving the thrust bar to create of a nested arrangement of a 3×8 grouping of articles.
Figure 4C:
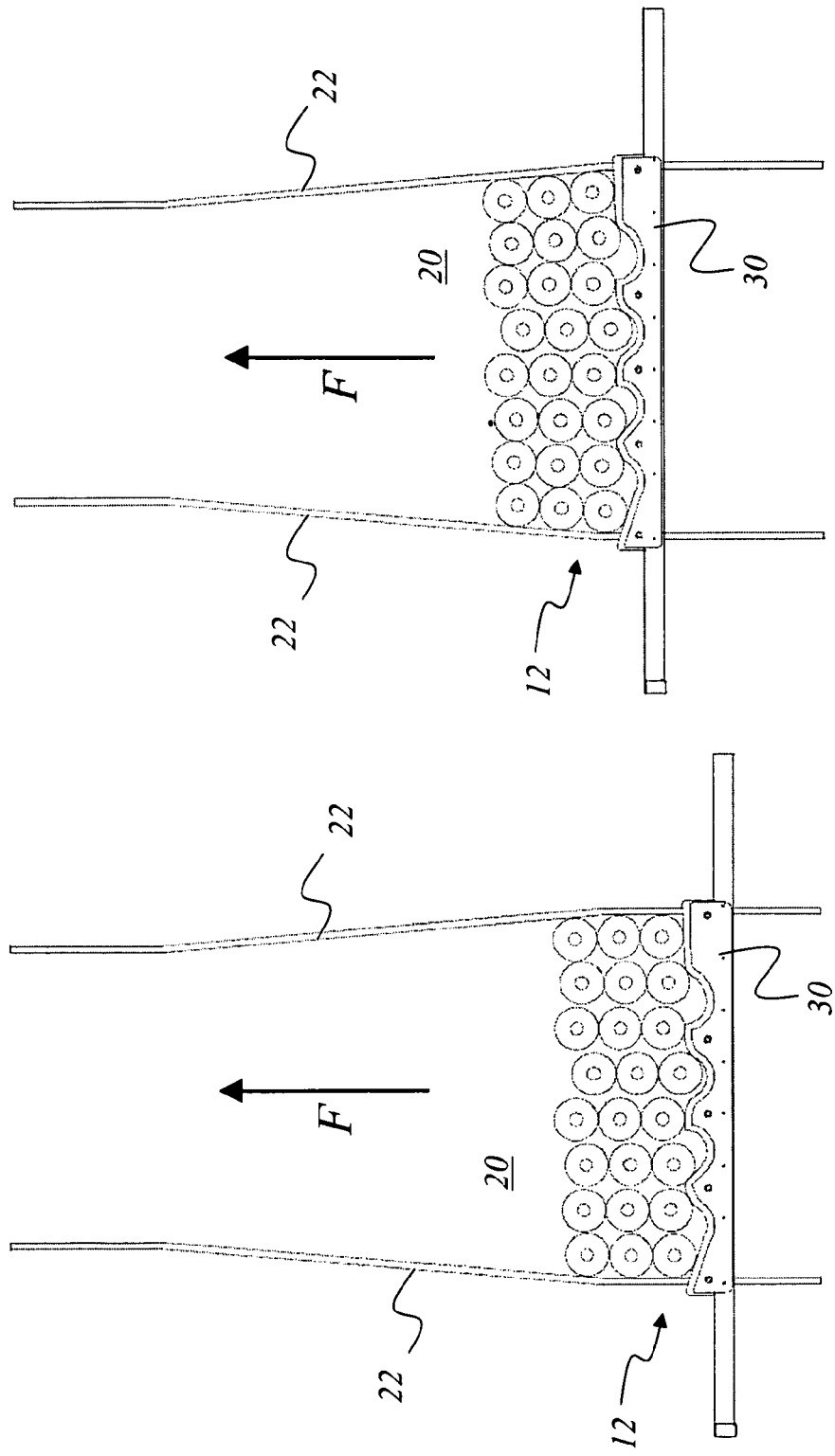
Figure 4F:
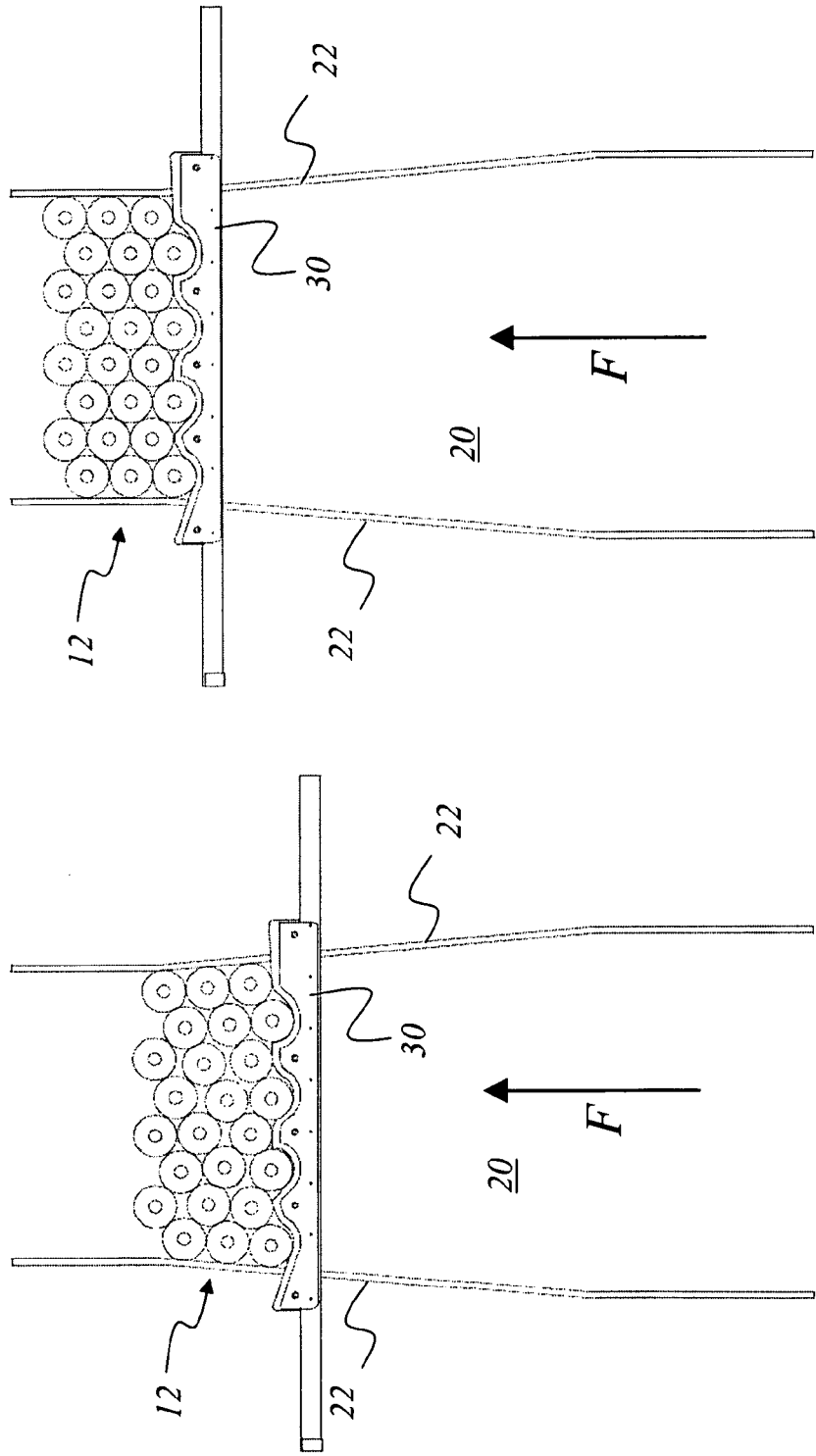
Figure 4G:
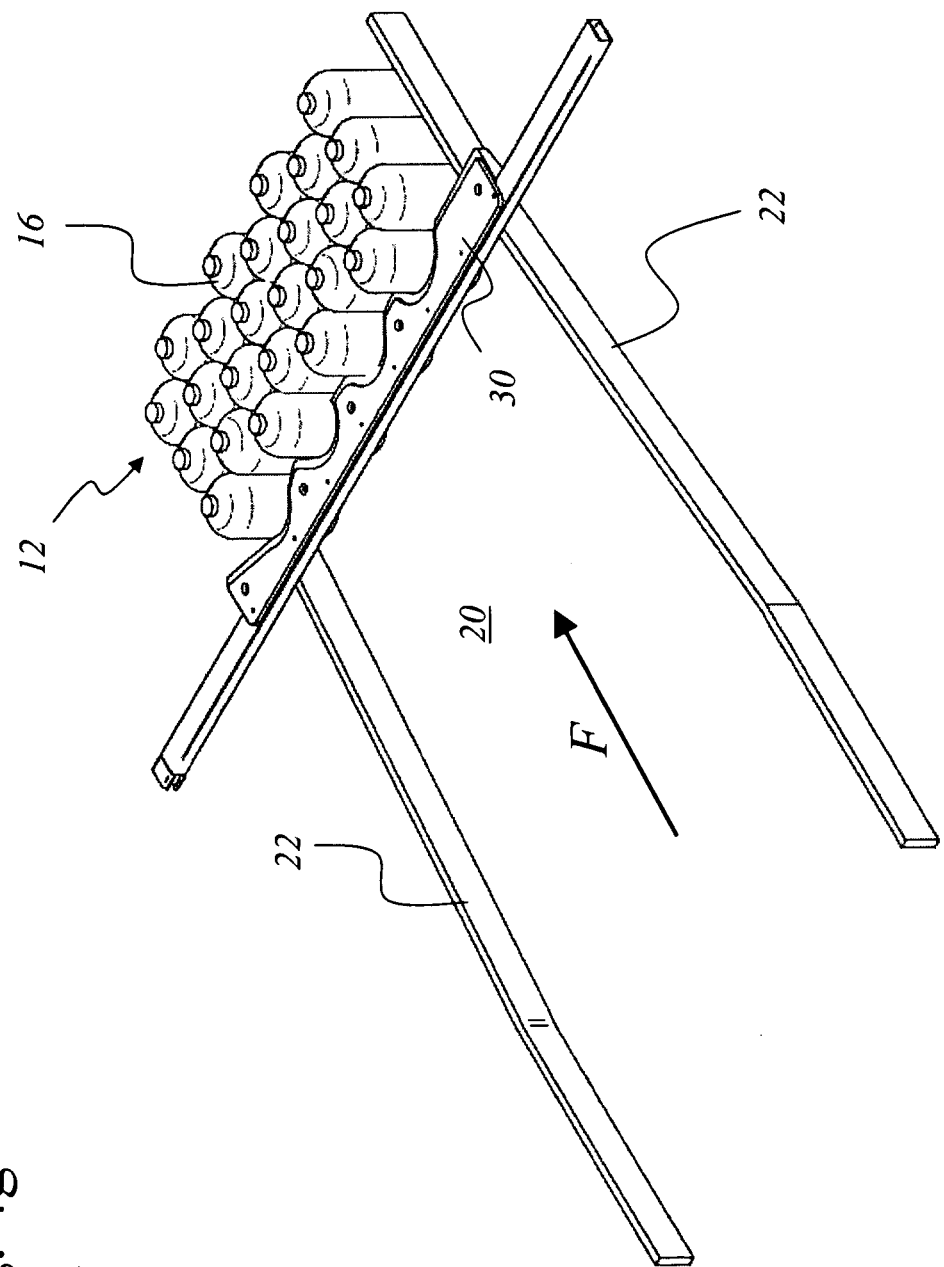

FIGS. 2*a*, 2*b* and 2*c* show different views of an embodiment of the thrust bar 30 according to the invention which has the profiling 32 on the side pointing towards the group 12 of articles 14 or drinks containers 16. The profiling 32 corresponds with an outer contour of a nest-like arrangement of the articles 14. Thus the thrust bars 30 wave or cam profile for which the alternating depressions 40 and cams 42 each have a suitable profile height so that the articles can be moved in the desired way. The alternating depressions 40 and cams 42 are also at a defined distance from each other which is less than an article diameter, as illustrated by the nested grouping of articles shown on the right in FIG. 1. As illustrated in FIG. 2*a* the flanks 44 of the profiling 32 are unsymmetrical and not designed the same for the three cams 42 which are present. The profiling shown is matched to a group 12 of a total of eight rows of articles located next to each other which should be transformed into an 8×3, 8×4, 8×5 or 8×n bundle (see also FIG. 1) in a nested arrangement. In the final arrangement each of the depressions 40 accommodates a cylindrical container 16 while, on the front side, each cam 42 is also in contact with a cylindrical container 16. As illustrated in FIGS. 5 to 7, the profile 32 shown can also, however, be used for odd arrangements since, in this case, a shorter section of the lateral contact surface 46 is used; the eighth flank 44*h* is used but not, however, the adjacent lateral contact surface 46 on the right.

While transforming the containers 16 into this compound arrangement two containers 16 which are next to each other slide from the first flank 44*a* on the far left towards the right until the second container 16 from the left is pushed by the container 16 on the far left out of the first depression 40*a* in the direction of the second flank 44*b* and onto the front side of the first cam 42*a* (see also FIG. 1). To ease this sliding movement along the first flank 44*a* it is hardly curved but is made instead to be relatively flat and straight. The second flank 44*b* pointing towards the first cam 42*a* is also relatively flat and straight, just like the third flank 44*c* which connects the first cam 42*a* with the second depression 40*b*. A container 16 glides along this third flank 44*c* to the right into the second depression 40*b* during formation of the nested arrangement where it finally comes to rest, limited in its movement on the right and encompassed by the fourth flank 44*d* which has a distinctly concave curvature which corresponds to the cylindrical outer contour of the container 16. The fact there is no sliding movement on this fourth flank 44*d* but just a catching movement of the third container 16 from the left means that it is meaningful to adapt it to the contour of the container.

The fifth flank 44*e*, which connects the second cam 42*b* with the third depression 40*c* does, on the other hand, have a convex curvature which supports gliding of a container 16 along this flank 44*e* to the left. The sixth flank 44*f* connecting to it at the right has a virtually symmetrical convex curvature in the direction of the third cam 42*c* which also eases sliding of a container 16 along this flank 44*f*. The seventh flank 44*g* which is located between the third cam 42*c* and the fourth depression 40*d* does, on the other hand, have a distinctly concave curvature since it serves to accommodate a container 16 coming towards it from the right and is not overcome to the left in the direction of the third cam 42*c*. The eighth flank 44*h* is again approximately elongated and leads with its flat in angle to the lateral contact surface 46 which borders on the side wall 22 of the transport route 18.

FIGS. 1 and 2*a* illustrate together the movements of a container 16 while being conveyed along the conveying direction F from left to right. The contour of the flanks 44, depressions 40 and cams 42 can also optionally deviate from the profiling 32 shown; the important point here is, however, that the movements of the individual container 16 are determined beforehand and that a jerk-free and fault-free movement to the side can be achieved as far as possible in order to achieve the desired nested arrangement of the group 12 of articles 14 according to FIG. 1 (at the far right).

The thrust bar 30, is fastened as shown in FIGS. 2*a* to 2*c*, on both sides to roller chains 36 which provide the desired feeding movement of the thrust bars 30. As further illustrated, in particular by the cross-section A-A in FIG. 2*b*, the profiled bar 32 can be fastened to be replaceable on the cross bar 31 of the thrust bar 30 by means of the screw connections 33 so that different profilings 32 can be selected as required and mounted in the device 10.

It is optionally possible, according to FIG. 3, to attach a movable and/or manually adjustable and fixable guide element 48, moving against the force of a spring, on at least one side flank of a cam 44, in this case on the second flank 44*b*, to apply side movement components to the movable rows of articles 14.

It is also possible to provide more such adjustable or movable guide elements 48 which are preferably movable in a way which can influence the shifting movements of the articles 14, in a suitable way, of the groups of articles 12 through their coming into contact with the thrust bar 30. As can be understood from FIG. 1 and FIG. 3*b* the swiveable guide element 48 can support the sliding movement of the second containers 16 on the left in the direction of the first cam 42*a* without hindering the contact movement of the container 16 at the far left into the first depression 40*a*. The guide element 48 can move away to the right just as soon as the left-hand container 16 is lying in the depression 40*a*. On the other hand it does prevent the second container 16 from lying in the first depression 40*a*. Therefore the guide element 48 or a plurality of such guide elements 48 influence correct placing of the container 16 according to the profiling 32 used. A detailed view of the guide element 48 is given in the partial cross-sections in FIGS. 3*d* and 3*e*.

In a plurality of schematic views, FIG. 4 shows the course of movement during pushing by the thrust bar to create a nested arrangement of a 3×8 grouping of articles. Thus in a perspective representation FIG. 4*a* illustrates the starting situation of the not yet re-grouped 3×8 arrangement of group 12 of drinks containers 16 which have been brought into the nested arrangement according to FIGS. 4*f* and 4*g* by the thrust bar 30. On the left side FIG. 4*b* shows the starting situation and on the right the first contact of the asymmetrically profiled thrust bar 30 on the group of containers 12 so that these are gradually (FIG. 4*c*, FIG. 4*d*, FIG. 4*e*) always pushed forward in the area of the partial section 20 and conveyed along the constricted side walls or the side border guides 22 and are therefore pushed together transversely to the conveying direction F until the desired final position according to FIG. 4*f* (on the right) and FIG. 4*g* is achieved. In contrast to the following arrangements illustrated below, the right-hand row of containers 16 lies fully against the lateral contact surface 46 which is aligned transverse to the conveying direction F.

Figure 5A:
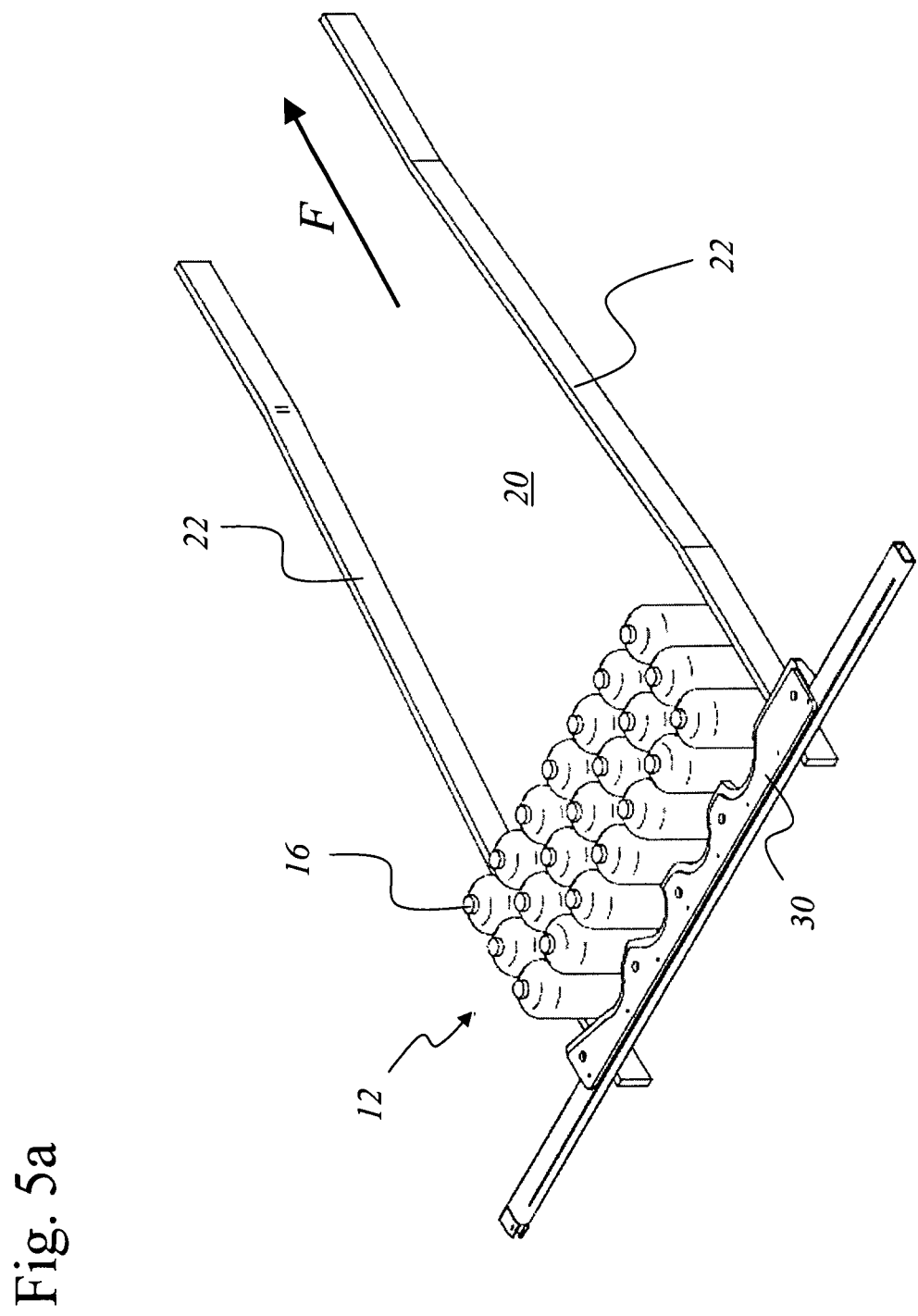
FIG. 5 shows in a plurality of schematic views the motion sequence for moving the thrust bar to create of a nested arrangement of a 3×7 grouping of articles.
Figure 5G:
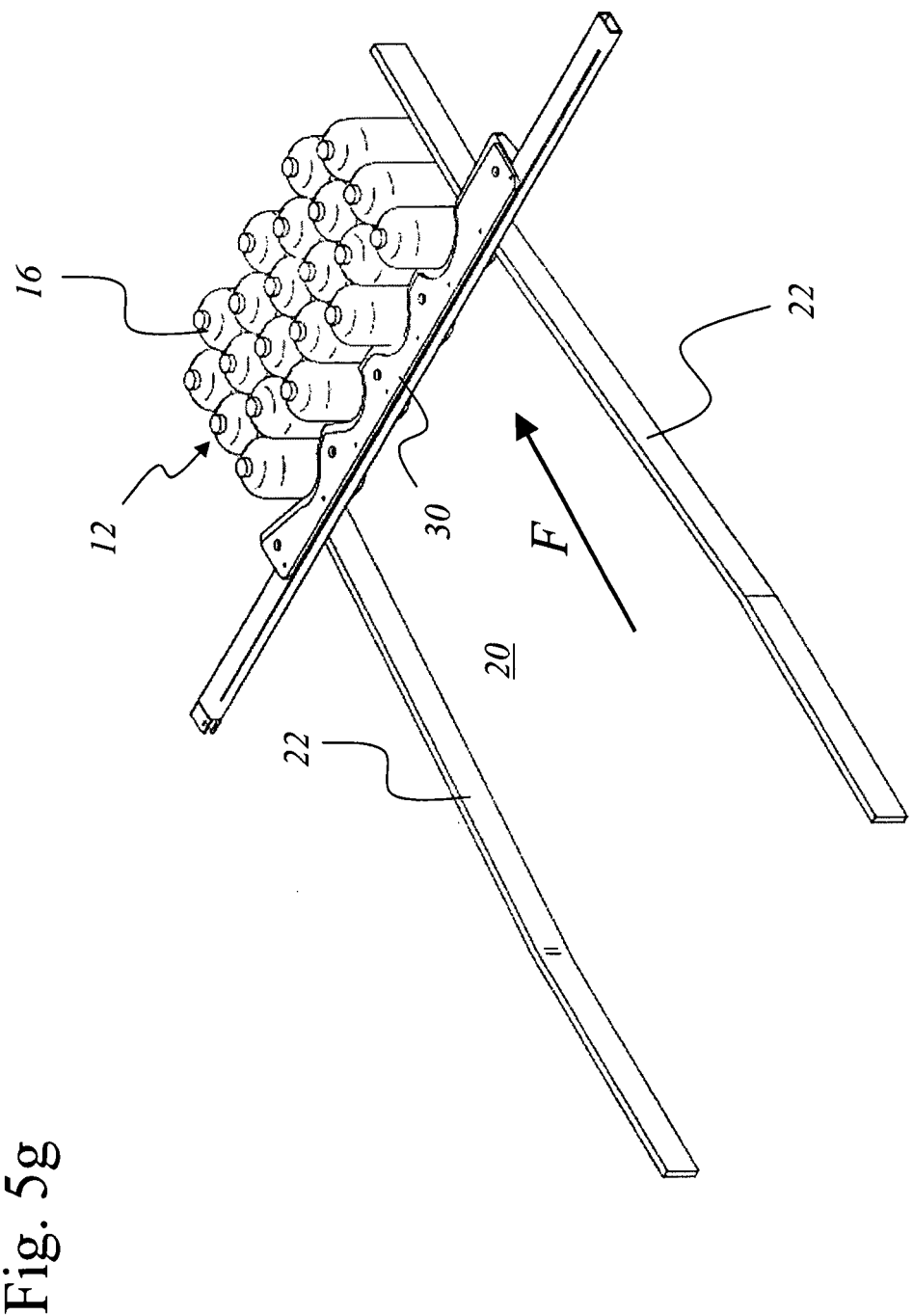
Figure 6A:
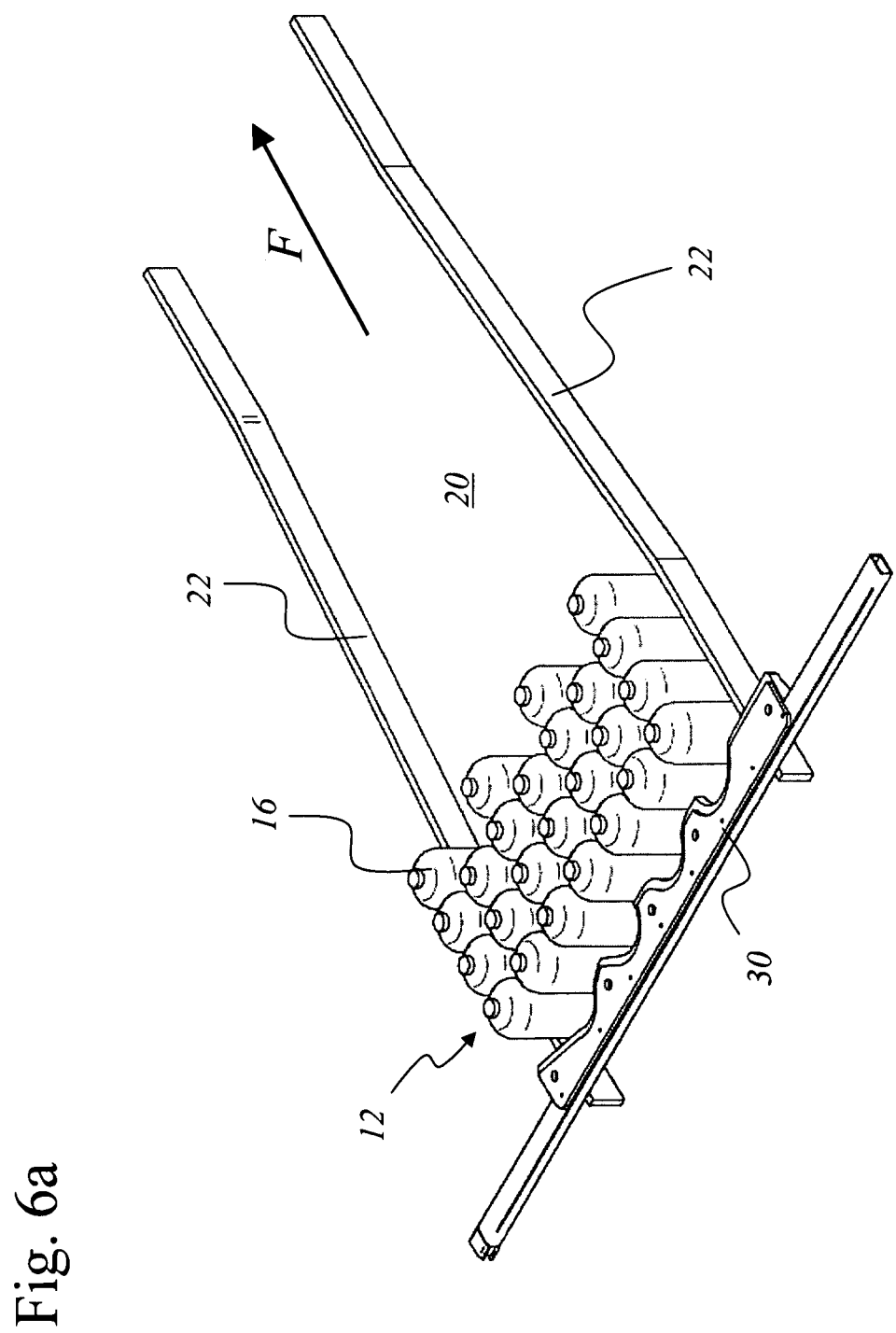
FIG. 6 shows in a plurality of schematic views the motion sequence for moving the thrust bar to create of a nested arrangement of a combined 4×7/3×7 grouping of articles.
Figure 6D:
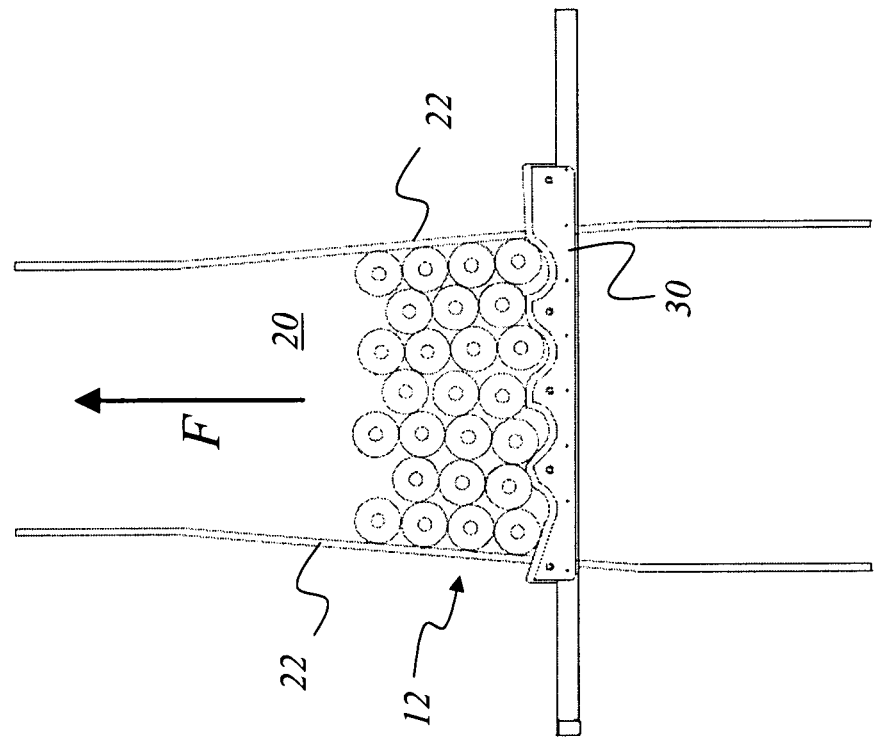
Figure 6D:
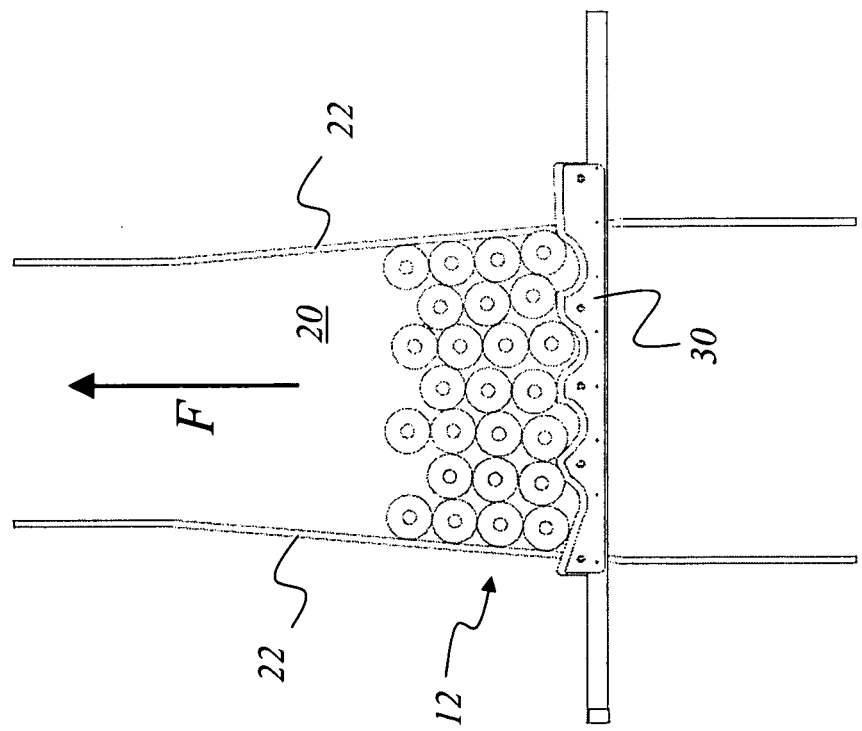
Figure 6G:
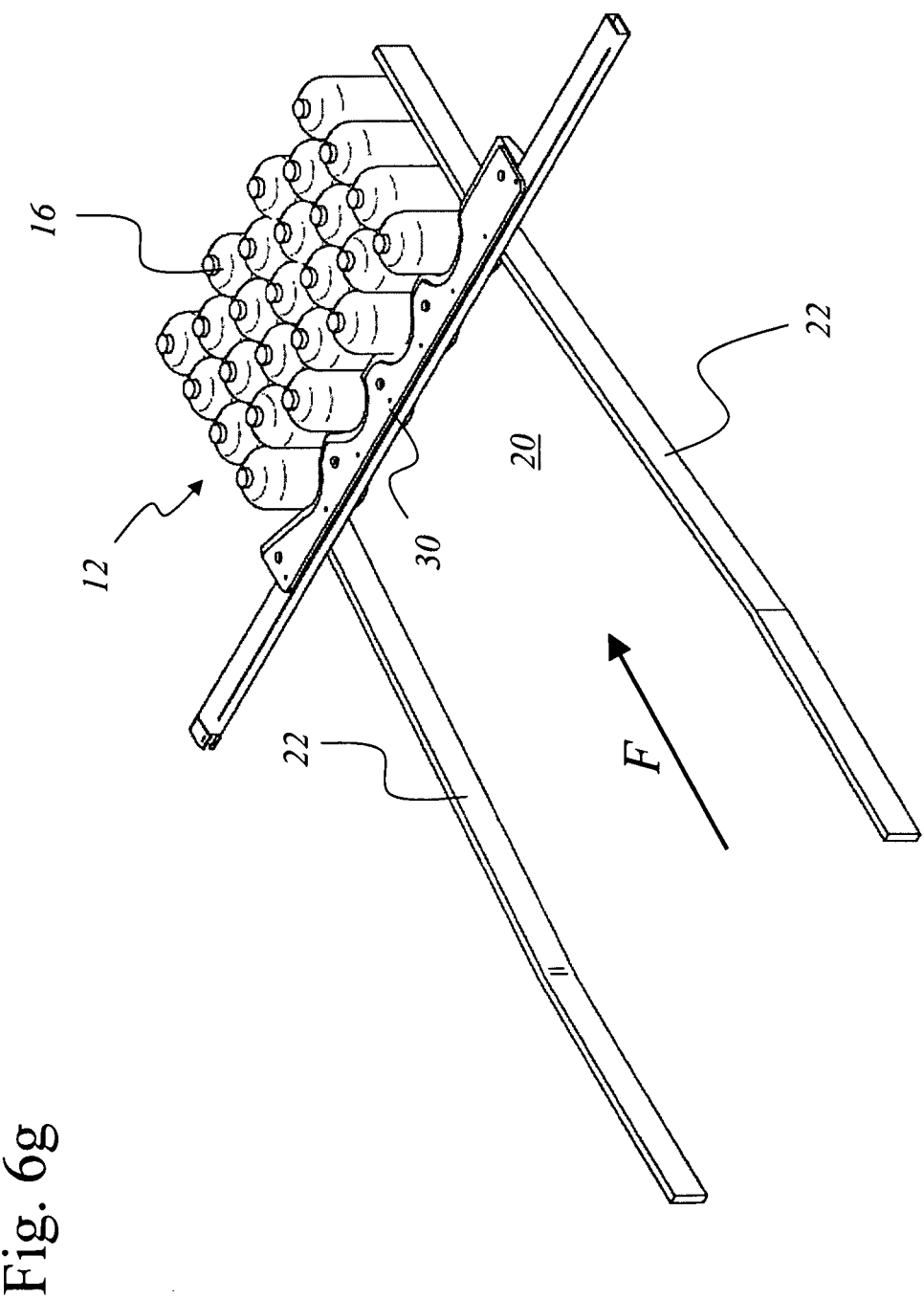

In a plurality of schematic views, FIG. 5 shows the course of movement during pushing by the thrust bar to create a nested arrangement of a 3×7 grouping of articles. Thus in a perspective representation FIG. 5*a* illustrates the starting situation of the not yet re-grouped 3×7 arrangement of the group 12 of drinks containers 16 which have been brought into the nested arrangement according to FIGS. 5*f* and 5*g*. On the left side FIG. 5*b* shows the starting situation and on the right the first contact of the asymmetrically profiled thrust bar 30 on the group of containers 12 so that these are gradually (FIG. 5*c*, FIG. 5*d*, FIG. 5*e*) always pushed forward in the area of the partial section 20 and conveyed along the constricted side walls or the lateral border guides 22 and are therefore pushed together transversely to the conveying direction F until the desired final position according to FIG. 5*f* (on the right) and FIG. 5*g* is achieved. In contrast to the 3×8 arrangement described above the right-hand row of containers 16 does not lie against the lateral contact surface 46 which is aligned transverse to the conveying direction F but is instead on the flank of the profiling on its right.

In a plurality of schematic views, FIG. 6 shows the course of movement during pushing by the thrust bar to create a nested arrangement of a combined 4×7/3×7 grouping of the articles. The outer rows each have four containers 16 located one after the other while neighbouring rows in towards the middle each have three containers 16 located one after the other, just like the centre row. The inner rows to the left and the right of the central row also have four containers 16 located one after the other (see also FIG. 6*b* ff.). Thus in a perspective representation FIG. 6*a* illustrates the starting situation of the not yet re-grouped 4×7/3×7 arrangement of the group 12 of drinks containers 16 which have been brought into the nested arrangement according to FIGS. 6*f* and 6*g*. On the left side FIG. 6*b* shows the starting situation and on the right the first contact of the asymmetrically profiled thrust bar 30 on the group of containers 12 so that these are gradually (FIG. 6*c*, FIG. 6*d*, FIG. 6*e*) always pushed forward in the area of the partial section 20 and conveyed along the constricted side walls or the lateral border guides 22 and are therefore pushed together transversely to the conveying direction F until the desired final position according to FIG. 6*f* (on the right) and FIG. 6*g* is achieved. In contrast to the 3×8 arrangement described above the right-hand row of containers 16 does not lie against the lateral contact surface 46 which is aligned transverse to the conveying direction F but is instead on the flank of the profiling on its right.

Figure 7G:
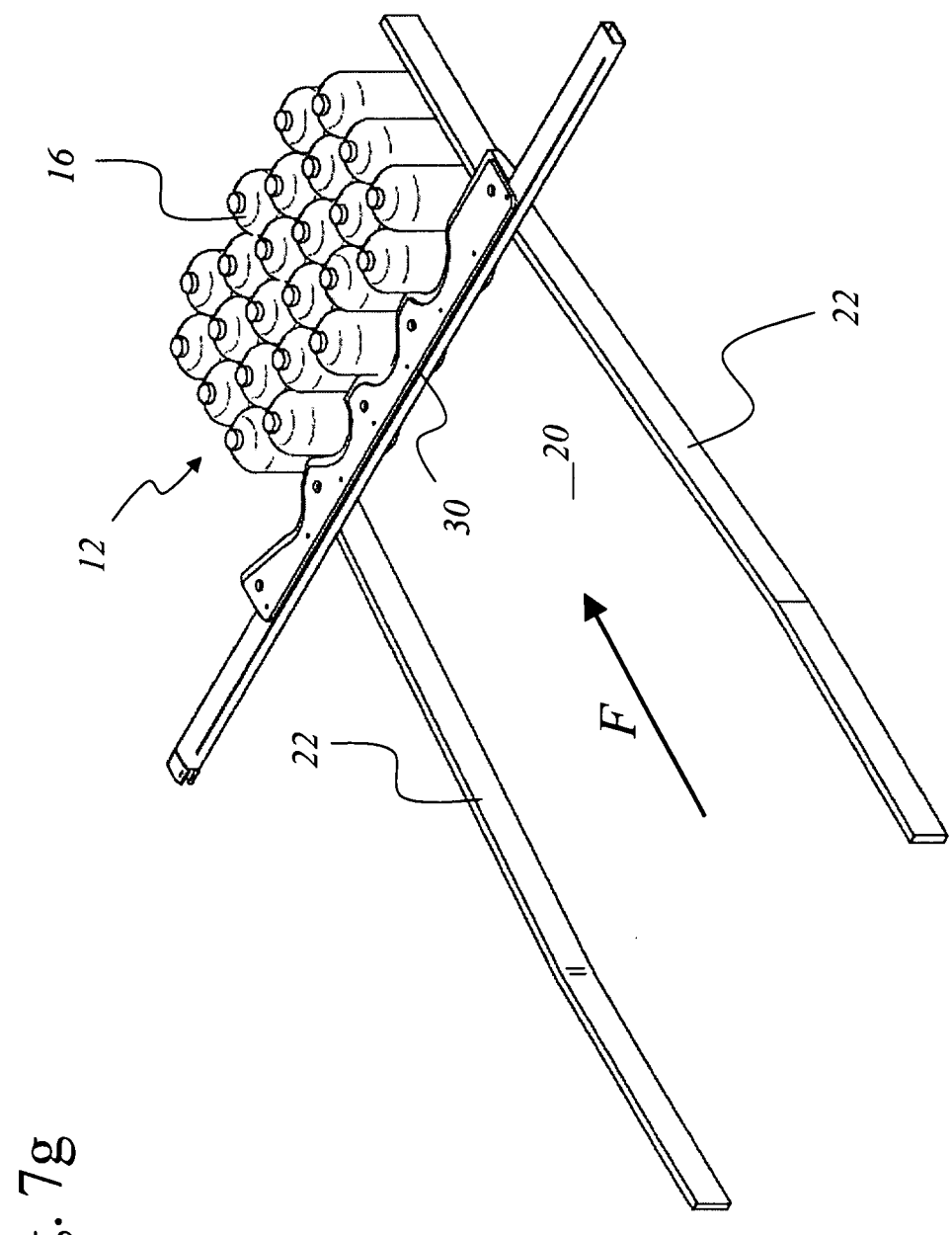
FIG. 7 shows in a plurality of schematic views the motion sequence for moving the thrust bar to create of a nested arrangement of a combined 3×7/4×7 grouping of articles.

In a plurality of schematic views, FIG. 7 shows the course of movement during pushing by the thrust bar to create a nested arrangement of a combined 3×7/4×7 grouping of the articles. The outer rows each have three containers 16 located one after the other while neighbouring rows in towards the middle each have four containers 16 located one after the other, just like the centre row. The inner rows to the left and the right of the central row also have three containers 16 located one after the other (see also FIG. 7*b* ff.). Thus in a perspective representation FIG. 7*a* illustrates the starting situation of the not yet re-grouped 3×7/4×7 arrangement of the group 12 of drinks containers 16 which have been brought into the nested arrangement according to FIGS. 7*f* and 7*g*. On the left side FIG. 7*b* shows the starting situation and on the right the first contact of the asymmetrically profiled thrust bar 30 on the group of containers 12 so that these are gradually (FIG. 7*c*, FIG. 7*d*, FIG. 7*e*) always pushed forward in the area of the partial section 20 and conveyed along the constricted side walls or the lateral border guides 22 and are therefore pushed together transversely to the conveying direction F until the desired final position according to FIG. 7*f* (on the right) and FIG. 7*g* is achieved. In contrast to the 3×8 arrangement described above the right-hand row of containers 16 does not lie against the lateral contact surface 46 which is aligned transverse to the conveying direction F but is instead on the flank of the profiling on its right.

The compacted and nested 8×4 arrangement shown in FIG. 1 or the group 12 brought into another arrangement not shown is subsequently packaged, in particular using shrink foil wrapped around the group of articles which is tensioned firmly around the group of articles 14 through the action of heat, and in this way produces an easy to transport, stackable and palletable bundle. The form of such a bundle of the container 16 is very stable due to the tight packaging and the fact that the outside surfaces lie tightly together; it hardly has any tendency to warp or deform so that it is possible to make very stable stacked formations as, for example, when stacking the bundles on pallets.

Figure 9:
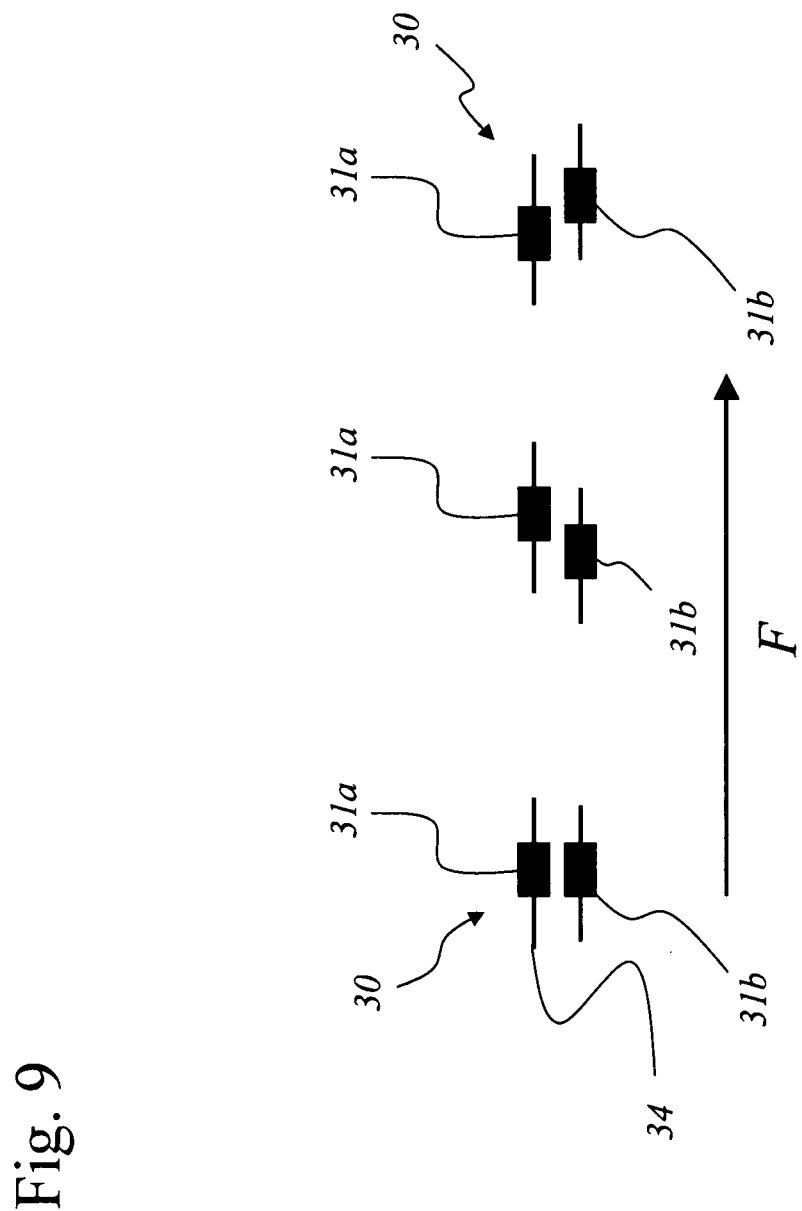
FIG. 9 shows a schematic diagram of a variant of a thrust bar according to the invention which includes a plurality of movable bar parts which can be moved relative to each other.

The schematic diagram in FIG. 9 shows a side view of a variant of a thrust bar 30 according to the invention which consists of a plurality of bar parts 31*a* and 31*b* which move relative to each other. Thus an advantageous variant of the arrangement according to the invention can provide for thrust bar parts 31*a* and 31*b* located in pairs which can be moved relative to each other in the direction of transport F, which can also be each profiled differently. Thus the upper thrust bar part 31*a*, for example, can have profiling which approximates the edge contour of the original article formation or represents it while the thrust bar located immediately below it 31*b* can have profiling which approximates the compacted or nested article formation to be achieved. Since both thrust bar parts 31*a* and 31*b* each have a separate traction element 34 to generate the circulating longitudinal movement, movements according to the middle and right-hand position can be generated without difficulty. Thus, the original profiling of the upper bar 31*a* can initially lead and the lower bar 31*b* can pursue it in a later course of conveying so that its profiling dictates the final contour of the bundle form.

One such arrangement of thrust bar parts 31a and 31b in pairs can alternatively or additionally also be provided to allow shifting of the two thrust bar parts 31a and 31b as a pair in a horizontal direction transverse to the direction of transport F of the articles. The flanks of the two bars 31a and 31b which lie one above the other, and which can be shifted in a horizontal direction, are brought together as necessary in order to obtain the desired profiling. It should therefore be emphasised that the thrust bar 30 with the profiling can fundamentally also be designed to be made up of a plurality of parts whereby the parts can be moved relative to each other. The resulting profiling of the thrust bar 30 can be altered in this case during the formation process so that the articles can be moved in a targeted manner in a desired direction in order to finally obtain the target formation in which the pushed together articles are brought into a compact and compacted arrangement.

Basically, it is also possible to use more than two bar parts 31a and 31b in order, for example, to generate the desired movement and grouping of the articles and the desired compacted bundle forms, for example for large bundle formations.

The invention was described by referring to a preferred embodiment. It is, however, quite conceivable for an expert in the field that modifications or changes can be made to the invention without leaving the scope of protection of the following claims.

LIST OF REFERENCE NUMBERS

10 A device, a device for formation of a nested arrangement of articles or drinks containers
12 Group
14 Articles
16 Drinks containers
18 Transport route
20 Partial section
22 Side walls/lateral border guide
24 Horizontal conveyor
26 Row
28 Lane separator
30 Thrust bar
31a Upper part of the bar
31b Lower part of the bar
32 Profiling
34 Traction element
36 Roller chain
38 Stop bar
40 Depression
40a, 40b, 40c, 40d first, second, third, fourth depression
42 Cam
42a, 42b, 42c first, second, third cam
44 Flank
44a, 44b, 44c, 44d, 44e, 44f, 44g, 44h first, second, third, fourth, fifth, sixth, seventh, eighth flank
46 Lateral contact surface/fourth cam
48 Guide element
F Conveying direction

What is claimed is:

1. A method for formation of a nested compacted arrangement of articles to be packaged, sub-divided into groups, preferably as a plurality of rows of articles arranged one after the other, preferably the same type of articles, in particular cylindrical articles within a packaging machine, the group of articles being guided through the packaging machine via at least one regularly or irregularly profiled or asymmetrically formed bar, at least in a partial section of its transport route, in particular in a conveying direction, along the side walls in a tapered area which comes into contact with an end face of the group of articles, in particular in a conveying direction at the rear side of the group of articles and in doing so at least some of the articles of the group are pushed together into the nested compacted arrangement;
   wherein a front edge of the at least one bar is profiled to define a profiling, the profiling corresponding with an outer contour of the group of articles being pushed into the nested compacted arrangement, the profiling including a wave or cam profile with alternating depressions and cams at a defined distance in the conveying direction of less than an article diameter, the profile having flanks between the depressions and cams, wherein in the nested compacted arrangement each of the depressions accommodates and article while each cam is also in contact with an article, and wherein while guiding the articles into the nested compacted arrangement, the articles slide along the flanks.

2. The method according to claim 1 in which the partial section of the transport route with the tapered side walls has a contact surface for sliding pushed movement of the articles which are pushed from the rear side of the group in the direction of transport through contact with the profiled bar acting as a thrust bar.

3. The method according to claim 1 in which the articles are conveyed in a plurality of single rows travelling parallel to each and separated from each other in a horizontal direction and which are transferred in conveying direction along the side walls to a tapered area without lane separators within which every group of a plurality of articles is subjected to offsetting and/or shifting movements of the articles relative to each other in a plurality of conveying directions through the action of the profiled thrust bar moved towards the group from the rear to bring them into the compacted arrangement.

4. The method according to claim 1 in which the rear-most articles of each group, with the profiled thrust bar engaging, while moving along the tapered area, adjust their position to the contouring of the thrust bar and are shifted into the nested compacted nest like arrangement.

5. The method according to claim 1 in which, after shifting the articles, the rear articles of a row viewed in the direction of transport are in a depression on the profiled thrust bar and the rear articles of a neighbouring row viewed in the direction of transport come into contact with a projection or cam on the thrust bar.

6. The method according to claim 1 in which the partial section of the transport route with the tapered side walls has a transport plane with a moving contact surface for upright transport of the articles where the articles are slowed through the action of pushing against the direction of transport by a profiled stop bar at the front side of the group.

7. The method according to claim 6 in which the front articles of each group adjust their position, with the profiled stop bar engaging during this contact along the tapered section, to the contouring of the stop bar and are shifted into the nested compacted arrangement.

8. The method according to claim 6 in which, after shifting the articles, the front articles of a row viewed in the direction of transport are in a depression on the profiled stop bar and the front articles of a neighbouring row viewed in the direction of transport come into contact with a projection or cam on the stop bar.

9. The method according to claim 1 in which a side movement of single articles occurs due to a movement component perpendicular to the conveying direction while moving the articles.

10. The method according to 18 in which at least one of the rows of articles to be moved is subjected to a movement component acting at the side by means of an element mounted movable on the bar.

11. The method as recited in claim 1 wherein the articles to be packaged are a plurality of rows of articles arranged one after the other.

12. The method as recited in claim 1 wherein the articles to be packages are a same type of articles.

13. The method as recited in claim 12 wherein the articles are cylindrical articles.

14. A device for implementation of the method for formation of a nested compacted arrangement of articles to be packaged, sub-divided into groups, preferably as a plurality of rows of articles arranged one after the other, preferably the same type of articles, in particular cylindrical articles within a packaging machine, according claim 1, with a transport route for the group of articles which at least in a partial section in the conveying direction tapered along the side walls and where at least one profiled bar can be brought into contact with an end face of the group of articles, in particular in conveying direction, at the rear side of the group of articles to transform the articles into a compacted arrangement, at least one bar having a profiling pointing towards the group of articles, the profiling corresponding with an outer contour of the nested compacted arrangement of the articles;

the profiling including a wave or cam profile with alternating depressions and cams at a defined distance in the conveying direction of less than an article diameter, the profile having flanks between the depressions and cams, wherein in the nested compacted arrangement each of the depressions accommodates and article while each cam is also in contact with an article, and wherein while guiding the articles into the nested compacted arrangement, the articles slide along the flanks.

15. The device according to claim 14 in which the number of profiled bars on the side along the transport route for the articles are arranged on endlessly circulating traction elements.

16. The device according to claim 14 in which a profiled pushing bar or a un-profiled stop bar which should come into contact with the front articles at a front side of each group of articles is arranged to move with the group along the conveying direction.

17. A profiled pushing or stop bar to transform a group of articles being conveyed in a horizontal direction into a predefined, compacted, in particular nested arrangement, which has a profiling pointing towards the group of articles which corresponds with an outer contour of the nested arrangement of the articles, the profiling including a wave or cam profile with alternating depressions and cams at a defined distance in the conveying direction of less than an article diameter, the profiling having flanks between the depressions and cams, wherein in the nested arrangement each of the depressions accommodates and article while each cam is also in contact with an article, and wherein while guiding the articles into the nested arrangement, the articles slide along the flanks.

18. The pushing or stop bar according to claim 17 which is made up of a plurality of parts and at least two bar parts are moving relative to each other whose sum profile can be altered according to the relative position of at least two bar parts.

19. The pushing or stop bar according to claim 17 which has an unsymmetrical wave or cam profile for which the alternating depressions and cams each have a suitable profile height which is approximately half of the external diameter of an article or less and which each has a distance between them which represents the external diameter of an article or less.

20. The pushing or stop bar according to claim 17 which has a movable and/or manually adjustable and fixable guide element acting against the force of a spring on at least one side flank of a cam to apply a movement component acting from the side to the moving rows of articles.

* * * * *